(12) United States Patent
Kim

(10) Patent No.: US 8,732,772 B2
(45) Date of Patent: May 20, 2014

(54) IMAGE DISPLAY APPARATUS AND IMAGE DISPLAYING METHOD THEREOF

(75) Inventor: Bongkun Kim, Pyeongtaek-si (KR)

(73) Assignee: LG Electronics Inc., Seoul (KR)

(*) Notice: Subject to any disclaimer, the term of this patent is extended or adjusted under 35 U.S.C. 154(b) by 116 days.

(21) Appl. No.: 13/159,026

(22) Filed: Jun. 13, 2011

(65) Prior Publication Data

US 2012/0054790 A1    Mar. 1, 2012

(30) Foreign Application Priority Data

Aug. 31, 2010  (KR) .................. 10-2010-0084610
Apr. 15, 2011  (KR) .................. 10-2011-0035129

(51) Int. Cl.
*H04N 7/18*      (2006.01)
*H04N 21/433*    (2011.01)
*H04N 21/442*    (2011.01)

(52) U.S. Cl.
CPC ...... *H04N 21/4334* (2013.01); *H04N 21/44227* (2013.01)
USPC .............................................. 725/82; 725/81

(58) Field of Classification Search
None
See application file for complete search history.

(56) References Cited

U.S. PATENT DOCUMENTS

| 7,904,927 B2* | 3/2011 | Toriumi et al. ............ 725/62 |
| 2003/0046503 A1 | 3/2003 | Park |
| 2005/0125819 A1* | 6/2005 | Ono et al. ............ 725/14 |
| 2008/0163322 A1* | 7/2008 | Park et al. ............ 725/115 |
| 2008/0248786 A1* | 10/2008 | Yamada et al. ............ 455/414.2 |
| 2009/0052579 A1 | 2/2009 | Lee et al. |
| 2009/0300698 A1* | 12/2009 | Quigley et al. ............ 725/114 |
| 2010/0217837 A1* | 8/2010 | Ansari et al. ............ 709/218 |
| 2012/0096101 A1* | 4/2012 | Murphy ............ 709/206 |

FOREIGN PATENT DOCUMENTS

| KR | 10-2003-0020723 A | 3/2003 |
| KR | 10-2005-0046223 A | 5/2005 |
| KR | 10-2009-0009175 A | 1/2009 |

* cited by examiner

*Primary Examiner* — Nathan Flynn
*Assistant Examiner* — Omar S Parra
(74) *Attorney, Agent, or Firm* — Birch, Stewart, Kolasch & Birch, LLP

(57) ABSTRACT

An image display apparatus and an image displaying method thereof are disclosed, which can solve a problem of disturbance in watching TV through a detachable image display apparatus. Since the problem of disturbance in watching TV through a detachable image display apparatus, which may occur due to discharge of the mobile display device, can be solved, a user can conveniently and quickly use contents watched by himself(herself) immediately before the mobile display device is discharged.

5 Claims, 25 Drawing Sheets

FIG. 7
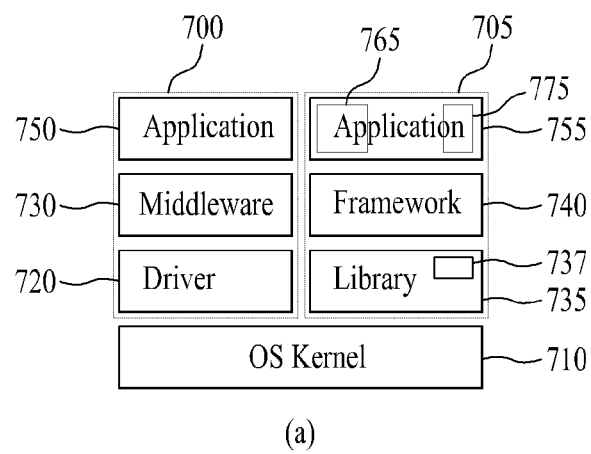
(a)
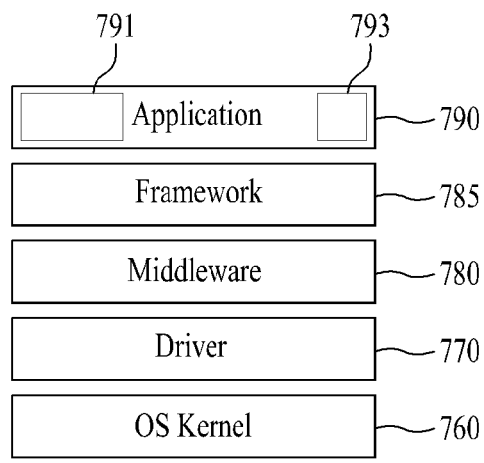
(b)

FIG. 16
 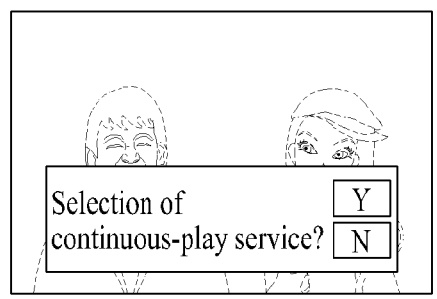
(a)  (b)
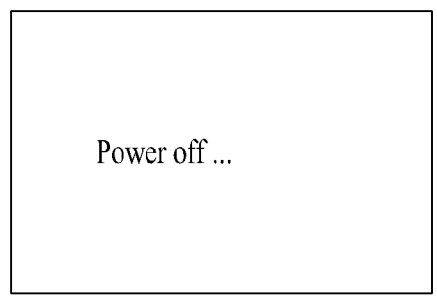
(c)

FIG. 17

| Power state of mobile display device | Recording process of station device |
|---|---|
| Power of 10% remains | Recording from 1.5 hours |
| Power of 5% remains | Recording from 1.7 hours |
| Power of 3% remains | Recording from 1.8 hours |
| ⋮ | ⋮ |

FIG. 18

| Syntax | No. of Bits | Format |
|---|---|---|
| event_information_table_section () { | | |
|     table_id | 8 | OXCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     number_events_in_section | 8 | uimsbf |
|     for (j = 0; j<num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i = 0; i<N;i++) { | | |
|             descriptor() | | |
|         } | | |
|     } | | |
|     CRC_32 | 32 | rpchof |
| } | | |

| Time of out-of-communication zone of mobile display device | Recording process of station device |
|---|---|
| More than 10 seconds | Recording from 0.7 hours |
| More than 30 seconds | Recording from 0.8 hours |
| More than 1 minute | Recording from 1.2 hours |
| ⋮ | ⋮ |

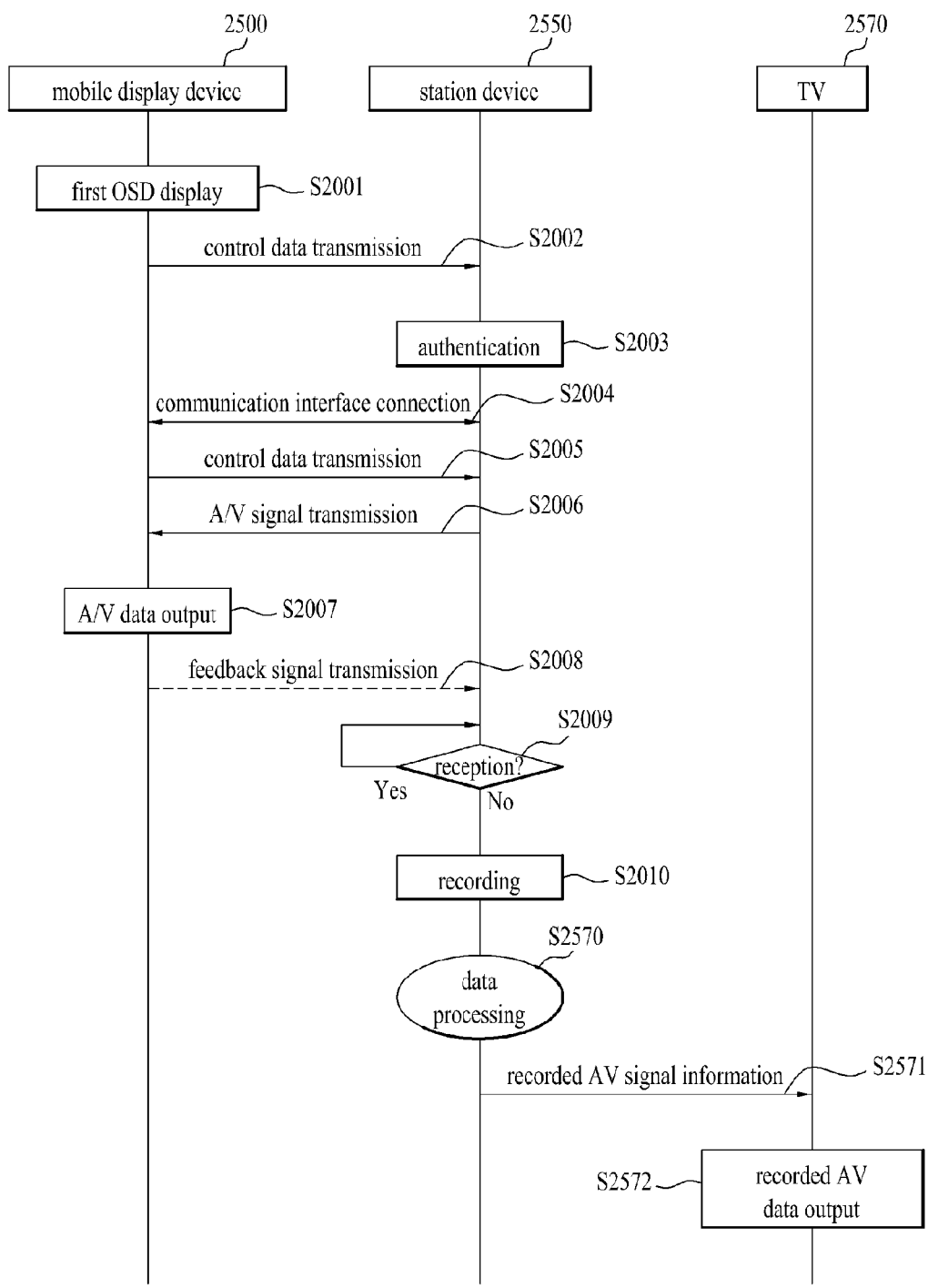

IMAGE DISPLAY APPARATUS AND IMAGE DISPLAYING METHOD THEREOF

This application claims the benefit of the Korean Patent Application Nos. 10-2010-0084610, filed on Aug. 31, 2010 and 10-2011-0035129 filed on Apr. 15, 2011, which are hereby incorporated by reference as if fully set forth herein.

BACKGROUND OF THE INVENTION

1. Field of the Invention

The present invention relates to an image display apparatus provided with an independently mobile display device and an image displaying method thereof, and more particularly, to an image display apparatus and an image displaying method thereof, in which the image display apparatus includes a mobile display device having a power supply electrically charged and discharged.

2. Discussion of the Related Art

Contents provided by a broadcasting station are transmitted through a propagation medium such as terrestrial, cable or satellite broadcasting. Then, a user can watch predetermined contents through an image display apparatus which is a receiver that can receive the propagation medium.

Generally, the image display apparatus receives the predetermined contents and displays for watching of the user. Examples of the image display apparatus include a digital broadcasting receiver such as a set-top box or digital TV, various mobile terminals (cellular phone, PDA, PMP, etc.), and a computer such as a personal computer or notebook computer.

Also, the image display apparatus can be provided in such a manner that a mobile display device is detached from a broadcasting receiver (for example, set-top box), which can receive an image signal.

This detachable image display apparatus allows a user to watch a video at a desired position because of mobility of the mobile display device. However, charging of the mobile display device is continuously required. If the mobile display device is discharged, playback of the video watched by the user is stopped. For this reason, a problem occurs in that the user may be disturbed in watching of contents.

Accordingly, an image display apparatus and an image displaying method thereof, which can solve the above problem occurring due to discharge of the mobile display device, will be required.

SUMMARY OF THE INVENTION

Accordingly, the present invention is directed to an image display apparatus and an image displaying method thereof, which substantially obviate ones or more problems due to limitations and disadvantages of the related art.

An object of the present invention is to provide an image display apparatus and an image displaying method thereof, which can solve a problem of disturbance in watching TV through a detachable image display apparatus according to the related art.

Another object of the present invention is to provide an image display apparatus and an image displaying method thereof, in which contents can automatically be played back from the time when playback of the contents is stopped due to discharge of a mobile display device, after a mobile display device is charged.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a mobile display device, which can perform communication with a station device, comprises the steps of accessing a data communication channel with a station device through a wireless network; transmitting control data requesting AV data to the station device; receiving the AV data from the station device; displaying the received AV data; and transmitting a discharge guide signal to the station device depending on a state of a battery of the mobile display device.

In another aspect of the present invention, a control method of a mobile display device, which can perform communication with a station device, comprises the steps of accessing a data communication channel with a station device through a wireless network; transmitting control data requesting AV data to the station device; receiving the AV data from the station device; displaying the received AV data; and transmitting data indicating a state of a battery of the mobile display device to the station device.

In other aspect of the present invention, a station device that can perform communication with a mobile display device comprises a wireless communication interface module connected with a data communication channel with a station device; an external device interface module receiving at least one AV data; a controller controlling the wireless communication interface module to transmit the AV data to the mobile display device if control data requesting the AV data are received through the data communication channel; and a memory storing the AV data from a third time after a first event occurs, wherein the controller controls the wireless communication interface module to transmit the AV data stored in the memory to the mobile display device if a second event occurs.

According to one embodiment of the present invention, since the problem of disturbance in watching TV through a detachable image display apparatus, which may occur due to discharge of the mobile display device, can be solved, a user can conveniently and quickly use contents watched by himself(herself) immediately before the mobile display device is discharged.

Also, the image display apparatus detached from the mobile display device performs a recording function of contents and transmits the recorded contents to the mobile display device through a wireless communication network to play the contents, whereby the user can conveniently watch the recorded image at a desired position.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a platform structure of a station part according to the embodiment of the present invention;

FIG. 16 is a diagram illustrating a first state change of a mobile display device illustrated in FIG. 14;

FIG. 17 is a diagram illustrating a mapping relation between a mobile display device and a station device in accordance with the second embodiment of the present invention;

FIG. 18 is a diagram illustrating a data structure used in a procedure for carrying out the second embodiment of the present invention;

FIG. 23 is a diagram illustrating a mapping relation between a mobile display device and a station device in accordance with the third embodiment of the present invention;

FIG. 25 is a flow chart illustrating a data transmission protocol between a mobile display device and a station device according to the fourth embodiment of the present invention.

DETAILED DESCRIPTION OF THE INVENTION

Reference will now be made in detail to the preferred embodiments of the present invention, examples of which are illustrated in the accompanying drawings, so that a person with an ordinary skill in the art to which the present invention pertains can easily carry out the embodiments. However, it is to be understood that various modifications can be made in the present invention and the present invention is not limited to the following description. In order to clarify the present invention, parts which are not related with the description will be omitted from the drawings, and wherever possible, the same reference numbers will be used throughout the drawings to refer to the same or like parts.

In the description, when some part "includes" some elements, it means that the part can further include other elements unless mentioned to the contrary. Also, terminologies " . . . part," " . . . block," and " . . . module" described herein mean a unit processing at least one function or operation, and can be implemented by hardware, software or combination of hardware and software.

Figure 1:
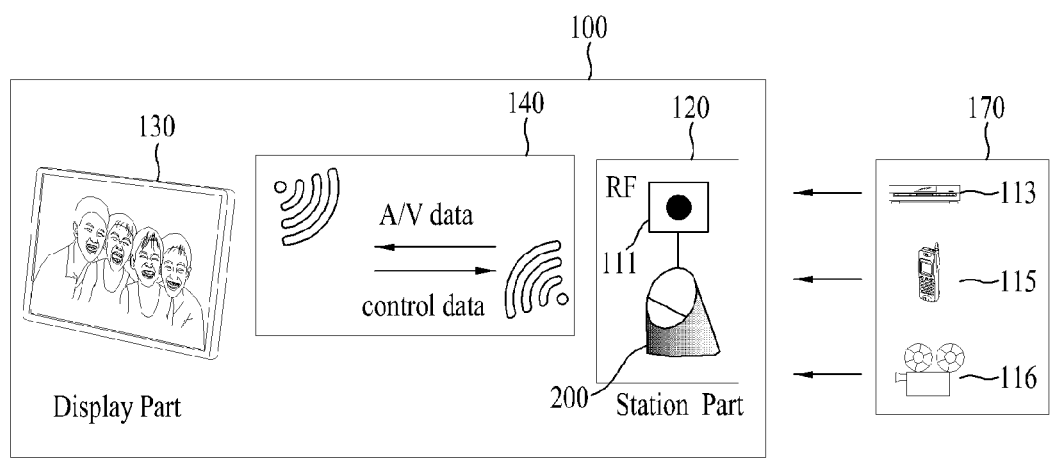
FIG. 1 is a diagram illustrating an image display apparatus according to the embodiment of the present invention.

FIG. 1 is a diagram illustrating an image display apparatus according to the embodiment of the present invention.

A system 100 of the present invention includes a station part 120 receiving a predetermined signal including an audio/video (A/V) signal from an external AV signal supply source 170 and a mobile display part 130 receiving the AV signal from the station part 120 through a wireless communication network and outputting the AV signal to a screen corresponding to the AV signal.

In the drawings, the AV signal is illustrated as A/V signal. The AV signal includes all signals for allowing display of an image screen that can be recognized visually.

The station part 120 according to the embodiment of the present invention includes a signal input module 111.

The signal input module 111 receives a predetermined signal including the AV signal from at least one of a terrestrial or cable broadcasting station and a server of an external content provider (CP) or a service provider (SP). The station part 120 transmits the input AV signal to the mobile display part 130 and at the same time receives control data from the mobile display module 130.

In this case, the control data may be data for controlling the operation of the station part 120 or the AV signal supply source 170, or data for controlling playback of an image based on the AV signal. Accordingly, the station part 120 performs the operation required by the control data.

External electronic devices 113~116 outputting the AV signal, the terrestrial or cable broadcasting station and the server of the external content provider or service provider will be referred to as the AV signal supply source 170.

Examples of the external electronic devices 113~116 include a digital versatile disk (DVD) device, a Blue ray device, a game device, a camera, a camcorder, a PC, a PDA, a PMP, a mobile communication terminal, and a computer (notebook computer). All devices, which can implement (or play) a predetermined application corresponding to a program for carrying out predetermined contents or predetermined functions, can be used as the external electronic devices. The station part 120 is connected with the external electronic devices 113~116 through an external device interface module in a wire or wireless mode. The aforementioned wireless communication network can be used as the external device interface module connected through a wireless mode.

Also, the station part 120 can function as a set-top box (STB). In other words, the station part 120 can receive the AV signal, i.e., a broadcast signal including a broadcast program transmitted from the broadcasting station, through a broadcasting transport medium such as airwaves, cable, satellite or IP. Accordingly, the station part 120 can decode the input AV signal, so that the AV signal can be output through the mobile display part 130.

The mobile display part 130 is physically spaced apart from the station part 120, and includes a power supply module which is charged and discharged. The mobile display part 130 is a mobile image output device operated by the power supplied from the power supply module.

In more detail, the mobile display part 130 may be an android based screen output device. Also, the mobile display part 130 receives the AV signal from the station part 120 through the wireless communication network 140 and outputs an image corresponding to the AV signal.

If the power supply of the mobile display part 130 is discharged at a predetermined time, the station part 120 records the AV signal input after the discharged time or stores image screen information of the AV signal corresponding to the discharged time. The recording operation of the station part 120 will be described in more detail with reference to FIG. 8 and FIG. 9.

All communication interface modules can be used as that wireless communication network 140 that can transmit and receive predetermined data through a wireless mode. A mobile communication module, a wireless Internet module or a short range communication module can be used as the wireless communication network 140.

The mobile communication module transmits and receives a radio signal to and from at least one of a base station, an external terminal and a server, on a mobile communication network. The radio signal can include various types of data based on transmission and reception of audio call signal, video call signal or text/multimedia message.

The wireless Internet module means a module for wireless Internet access, and may be provided inside or outside the station part 120 and the mobile display part 130 of the system 100. Examples of the wireless Internet technology include, but not limited to, Wireless LAN (WLAN)(Wi-Fi), Wi-Fi Direct, Wireless broadband (Wibro), World Interoperability for Microwave Access (Wimax), High Speed Downlink Packet Access (HSDPA), General Packet Radio Service (GPRS), CDMA, WCDMA, and Long Term Evolution (LTE). The wireless Internet module based on Wi-Fi may be referred to as "Wi-Fi module".

Considering that the Wireless Internet access based on Wibro, HSDPA, GPRS, CDMA, WCDMA, and LTE is basically performed through the mobile communication network, the wireless Internet module, which performs wireless Internet access through the mobile communication network, can be regarded as a type of the mobile communication module.

The short range communication module means a module for short range communication. Examples of the short range communication technology include Bluetooth, Radio Frequency Identification (RFID), Infrared Data Association (IrDA), Ultra Wideband (UWB), and ZigBee.

Among the aforementioned mobile communication modules and wireless Internet modules, an example of the wireless communication network based on a peer to peer mode without a network relay station includes the Wi-Fi Direct module. An access point (AP) may be used as the network relay station.

Most of the modules except for the Wi-Fi Direct module perform signal transmission and reception between the station part 120 and the mobile display part 130 by using the network relay station (for example, AP). Accordingly, if the Wi-Fi Direct module is used as the wireless communication network 140, since the network relay station is not required, the AV signal can be transmitted and received between the station part 120 and the mobile display part 130 more conveniently. The Wi-Fi Direct will be described in more detail with reference to FIG. 2.

Figure 2:
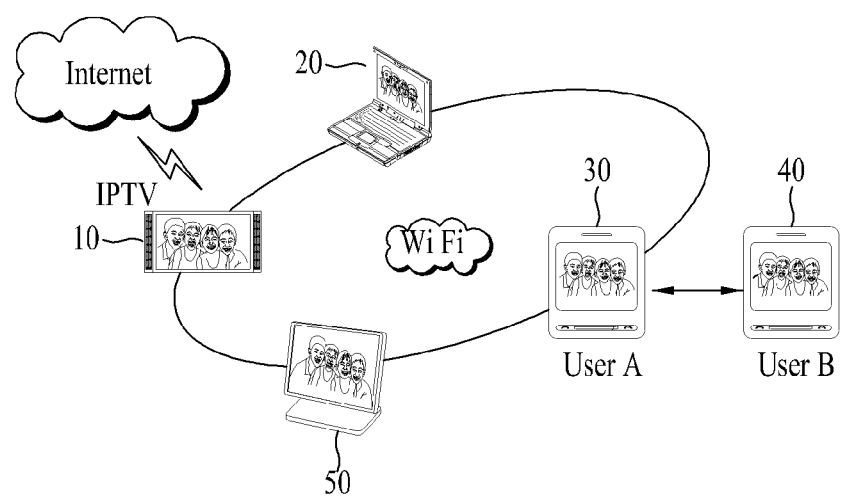
FIG. 2 is a diagram illustrating Wi-Fi Direct which is an example of a wireless communication network used in FIG. 1.

FIG. 2 is a diagram illustrating Wi-Fi Direct communication network according to the embodiment of the present invention.

In this specification, the Wi-Fi Direct module is used as the wireless communication network 140, whereby predetermined signals including the AV signal can be transmitted and received between the respective blocks (the station part 120 and the mobile display part 130) included in the system 100 through a wireless mode without the network relay station (for example, AP).

Accordingly, each of the station part 120 and the mobile display part 130 can be provided with a wireless LAN that supports a Wi-Fi Direct protocol allowing direct communication between nodes without access point (AP).

The Wi-Fi Direct communication network, which is the wireless communication network based on the Wi-Fi Direct, is a wireless network that realizes peer to peer transmission based on Internet connection between wireless network devices on one Wi-Fi Direct network or direct communication between the devices without the network relay station such as wireless access point (AP) or.

Referring to FIG. 2, the wireless communication network based on the Wi-Fi Direct network supports simultaneous connection among maximum electronic devices such as an image display apparatus 10 (for example, Internet protocol television (IPTV)), a PC 20, a mobile communication terminal A 30, a mobile communication terminal B 40, and a game console 50.

The Wi-Fi Direct can realize the wireless communication network without a wireless router, i.e., access point (AT), which is the wireless network relay station necessarily required for Wi-Fi according to the related art. The Wi-Fi Direct enables data transmission of maximum transmission speed of 300 Mbps and coverage of 120 m by using the wireless LAN standard of 802.11n. Also, since the latest encryption technology such as WiFi Protected Access 2 (WPA2) and WiFi Positioning System (WPS) can be used, security can be enhanced during communication.

For initial connection between the wireless network devices on the Wi-Fi Direct network, the IPTV 10 broadcasts its identifier, i.e., Service Set identifier (SSID), and the PC 20 detects all kinds of identifier information located in the periphery by receiving the broadcasted SSID. The PC 20 selects one of all the detected identifiers and is connected with the wireless network device of the selected identifier.

Near Field Communication (NFC) is used as a connection mode between the wireless network devices on the Wi-Fi Direct network. The NFC performs initial connection through physical access between the wireless network devices and is used for transportation cards, tickets, payment, etc.

Wired Equivalent Privacy (WEP), WiFi Protected Access/WiFi Protected Access2 (WPA/WPA2), WiFi Protected Setup (WPS), etc. are used for connection security between the wireless network devices on the Wi-Fi Direct network.

The WEP is challenge/response type security. If the IPTV 10 searches an identifier of the PC 20 and performs access request in accordance with the WEP, the PC 20 transmits a clear-text to the IPTV 10. Then the IPTV 10 encodes the clear-text with a previously distributed security key and then transmits the encoded clear-text to the PC 20 to approve security credentials and set up connection. The WPA/WPA2 is a security mode for improving security vulnerability of the WEP and serves to prevent key mixing per packet and packet forgery attack from occurring. The WPA/WPA2 supports user authentication, access control, authority verification, data confidential, integrity, etc.

The WPS is intended to solve inconvenience of initial connection for a power security function. The wireless network devices to which the WPS is applied are provided with a physical/virtual button and set up connection between them through button click.

Figure 3:
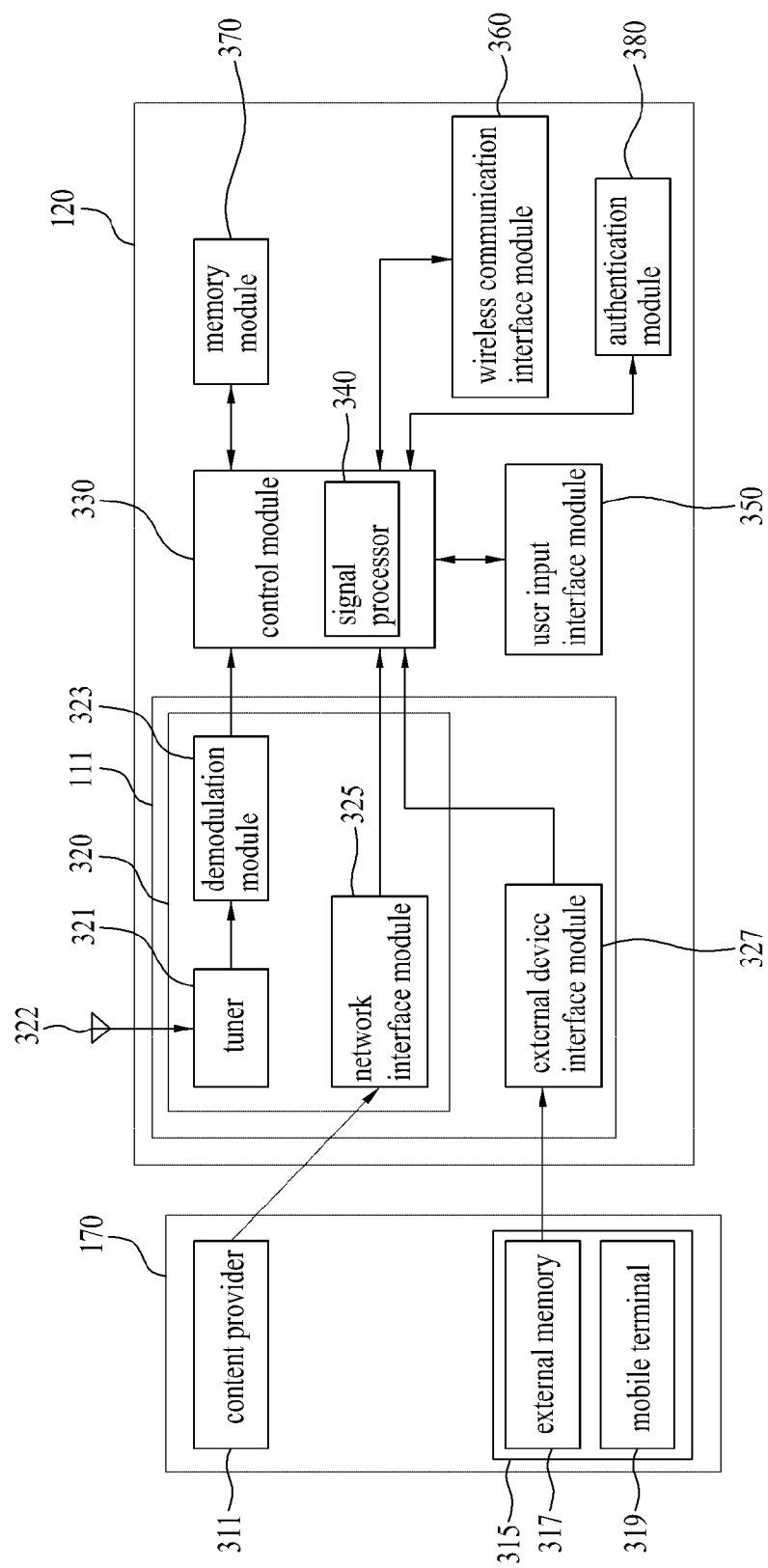
FIG. 3 is a block diagram illustrating a station device of FIG. 1.

FIG. 3 is a block diagram illustrating a station part of FIG. 1.

Referring to FIG. 3, the station part 120 according to one embodiment of the present invention includes a signal input module 111, which includes a broadcasting receiving module 320 and an external device interface module 327, a control module 330, a user input interface module 350, a wireless communication interface module 360, a memory module 370, an authentication module 380, and a camera module (not shown). The broadcasting receiving module 320 includes a tuner 321, a demodulation module 323 and a network interface module 325. The tuner 321 and the demodulation module 323 may selectively be provided together with the network interface module 325. All signals input to the signal input module 111 are referred to as AV signals.

A server of a content provider 311, which generates predetermined contents and provides the contents to the AV signal supply source 170 outputting AV signal, and at least one external device 315 are illustrated exemplarily in FIG. 3. Also, a terrestrial or cable broadcasting station (not shown) or a server of a service provider (not shown) may be used as the AV signal supply source 170. The external device 315 includes an external memory 317 and a mobile terminal 319 such as DMB and PMP, wherein the external memory 317 stores, plays or provides images. The external memory 317 can include a DVD device (not shown) and an HDD device (not shown).

The tuner 321 selects one of radio frequency (RF) broadcast signals received through an antenna (322), which corresponds to a channel selected by a user or all previously stored channels. Also, the tuner 321 converts the selected RF broadcast signal to an intermediate frequency signal or a baseband video or audio signal.

For example, if the selected RF broadcast signal is a digital broadcast signal, the tuner 321 coverts the selected RF broadcast signal to a digital IF (DIF) signal. If the selected RF broadcast signal is an analog broadcast signal, the tuner 321 coverts the selected RF broadcast signal to an analog baseband video or audio signal (CVBS/SIF). In other words, the tuner 321 can process both the digital broadcast signal and the analog broadcast signal. The analog baseband video or audio signal (CVBS/SIF) output from the tuner 321 may directly be input to the control module 330.

Also, the tuner 321 can receive RF broadcast signal of a single carrier based on an advanced television system committee (ATSC) mode or RF broadcast signal of multiple carriers based on a digital video broadcasting (DVB) mode.

In the mean time, the tuner 321 sequentially selects RF broadcast signals of all broadcast channels stored through a channel memory function from the RF broadcast signals received through the antenna, and converts the selected RF broadcast signals to intermediate frequency signals or baseband video or audio signals.

The demodulation module 323 receives the digital IF (DIF) signal converted by the tuner 321 and demodulates the received digital IF signal.

For example, if the digital IF signal output from the tuner 321 is based on the ATSC mode, the demodulation module 323 performs 8-vestigal side band (8-VSB) demodulation, for example. Also, the demodulation module 323 may perform channel decoding. To this end, the demodulation module 323 may include a trellis decoder, a de-interleaver, and a Reed-Solomon decoder to perform trellis decoding, de-interleaving, and Reed-Solomon decoding.

For example, if the digital IF signal output from the tuner 321 is based on the DVB mode, the demodulation module 323 performs coded orthogonal frequency division modulation (i) demodulation, for example. Also, the demodulation module 323 may perform channel decoding. To this end, the demodulation module 323 may include a convolution decoder, a de-interleaver, and a Reed-Solomon decoder to perform convolution decoding, de-interleaving, and Reed-Solomon decoding.

The demodulation module 323 can output a stream signal (TS) after performing demodulation and channel decoding. At this time, the stream signal may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. Specifically, the MPEG-2 TS may include a 4 byte header and 184 byte payload.

In the mean time, the aforementioned demodulation module 323 may be provided separately depending on the ATSC mode and the DVB mode. Namely, an ATSC demodulation module and a DVB demodulation module may be provided separately.

The stream signal output from the demodulation module 323 may be input to the control module 330. The control module 330 performs demultiplexing, video/audio signal processing, etc. and then outputs video to the mobile display part 130 and audio to an audio output module 185.

The external device interface module 327 may connect an external device to the station part 120. To this end, the external device interface module 327 may include an A/V input/output module (not shown) or a wireless communication module (not shown).

The external device interface module 327 is connected to the external device 315 such as Digital Versatile Disks (DVD), Blu-rays, game devices, cameras, camcorders, computers (e.g., notebook computers), etc. through wire/wireless cables. The external device interface module 327 transmits the AV signals including video, audio, or data signal externally input through the external device 315 connected thereto, to the control module 330 of the station part 120. Also, the external device interface module 327 outputs the video, audio or data signal processed by the control module 330 to the external device. To this end, the external device interface module 327 may include an A/V input/output module (not shown) or a wireless communication module (not shown).

The A/V input/output module (not shown) may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the station part 120.

The wireless communication module (not shown) may perform short range wireless communication with other electronic devices. The station part 120 can be connected with the other electronic devices through the network in accordance with the communication standards such as Bluetooth, Radio Frequency Identification (RFID), infrared Data Association (IrDA), Ultra Wideband (UWB), ZigBee, Digital Living Network Alliance (DLNA), etc.

In the mean time, the external device interface module 327 receives an application or a list of applications from the external device 315 and transmits the received application or the list of applications to the control module 330 or the memory module 370.

The network interface module 325 provides interface for connecting the station part 120 with wire/wireless networks including Internet network. The network interface module 325 may include an Ethernet terminal for wire network connection. Also, Wireless LAN (WLAN)(Wi-Fi), Wireless broadband (Wibro), World Interoperability for Microwave Access (Wimax), High Speed Downlink Packet Access (HS-DPA) can be used for the wireless network connection.

The network interface module 325 transmits or receives data to and from other users or other electronic devices through a network connected thereto or another network linked on the connected network. In particular, the network interface module 325 can transmit some contents data stored in the station part 120 to a user or electronic device selected from other users or electronic devices previously registered with the station part 120.

In the mean time, the network interface module 325 can access a predetermined web page through a network connected thereto or another network linked on the connected network. In other words, the network interface module 325 can transmit or receive data to and from a corresponding server by accessing the predetermined web page through the corresponding network. In addition, the network interface module 325 can receive contents or data provided by the content provider or the network operator. In other words, the network interface module 325 can receive contents such as movies, advertisements, games, VOD, broadcast signals, etc. and related information, which are provided from the content provider or the network provider through the network. Also, the network interface module 325 can receive update information and update files of firmware provided by the network operator. Moreover, the network interface module 325 can transmit data to the Internet or content provider or the network operator.

Furthermore, the network interface module 325 can selectively receive a desired one of contents open to the public, through the network.

The memory module 370 may store a program for processing and controlling each signal of the control module 330, or may store the processed video, audio or data signal.

Also, the memory module 370 may temporarily store the video, audio or data signal input from the external device interface module 327 or the network interface module 325. The memory module 370 may store information on a predetermined broadcast channel through a channel memory function. Also, the memory module 370 may store the application or the list of applications input from the external device interface module 327 or the network interface module 325.

Also, the memory module 370 may store a platform of FIG. 7, which will be described later.

In this specification, the memory module 370 records and stores the AV signal corresponding to the discharged time of a power supply (410 of FIG. 4) of the station part 120 or stores image screen information of the AV signal corresponding to the discharged time.

For example, if the AV signal corresponding to a predetermined broadcast program (for example, movie) is input to the signal input module 111 from a timing point t1 to a timing point t2 and then transmitted to the mobile display part 130, the power supply 410 of the mobile display part 130 is discharged at a timing point t3 between the timing point t1 and the timing point t2. In this case, as the power charged in the power supply 410 is discharged, the mobile display part 130 is powered off at the timing point t3 (or a timing point close to the timing point t3), and stops playback of the predetermined broadcast program.

Then, the memory module 370 can record and store the AV signal input from the signal input module 111 from the timing point t3 under the control of the control module 330. Alternatively, the memory module 370 may store image screen information (for example, scene information) at the timing point t3.

The memory module 370 may include a storage medium of at least one type of a flash memory type, a hard disk type, a multimedia card micro type, a card type memory (for example, SD or XD memory), RAM and ROM (EEPROM, etc.). The station part 120 can play contents files (moving picture files, still image files, music files, text files, application files, etc.) stored in the memory module 370 to provide the played contents files to the user.

Although FIG. 3 illustrates that the memory module 370 is provided separately from the control module 330, the scope of the present invention is not limited by the embodiment of FIG. 3. The memory module 370 may be included in the control module 330.

The user input interface module 350 transmits the signal input by the user to the control module 330 or transmits the signal from the control module 330 to the user.

For example, the user input interface module 350 may include a communication module and receive a control signal such as power on/off, channel selection and screen setup from a remote controller (200 of FIG. 9) or transmit the control signal from the control module 330 to the remote controller 200 in accordance with various communication modes such as RF communication mode and IR communication mode.

Also, for example, the user input interface module 350 may transmit a control signal input by a local key (not shown) such as a power key, a channel key, a volume key, and a setup key to the control module 330.

Also, for example, the user input interface module 350 may transmit a control signal input by a sensing module (not shown), which senses gesture of the user, to the control module 330, or may transmit the signal from the control module 330 to the sensing module. In this case, the sensing module may include a touch sensor, an audio sensor, a position sensor, an action sensor, etc.

The control module 330 may include a signal processor 340 that demultiplexes input streams and processes the demultiplexed streams through the demodulation module 323 or the external device interface module 327 to generate and output signals for video and audio output.

The AV signal input through the signal input module 111 and video-processed by the control module 330 or the AV signal, which is not video-processed, may be transmitted to the mobile display part 130 through wireless communication interface module 360.

In addition, the control module 330 controls overall operations of the station part 120. For example, the control module 330 may control the tuner 321 to tune RF broadcasting corresponding to the channel selected by the user or the previously stored channel.

Also, the control module 330 may control the station part 120 or the external device 315 connected with the station part 120 through a user command input through the user input interface module 350 or its internal program.

For example, the control module 330 controls the tuner 321 to input a signal of a channel selected in accordance with a predetermined channel selection command received through the user input interface module 350, and processes a video, audio or data signal of the selected channel. The control module 330 may allow the channel information selected by the user to be output through the wireless communication interface module 360 together with the processed video or audio signal.

The control module 330 may control the mobile display part 130 to display a video corresponding to the input AV signal. For example, the control module 330 may control the mobile display module device 130 to display broadcasting image input through the tuner 321, external input image input through the external device interface module 327, image input through the network interface module, or image stored in the memory module 370. At this time, the image displayed in the mobile display part 130 may be still image or moving image, and may be 2D image or 3D image.

Also, the control module 330 may control the mobile display part 130 to play contents. At this time, the contents may be contents stored in the memory module 370 of the station part 120, received broadcasting contents, or externally input contents. The contents may be at least one of broadcasting image, external input image, audio files, still image, accessed web screen, text files, and a predetermined application program. Furthermore, the control module 330 controls the wireless communication interface module 360 to transmit command signal to a mobile display part 130. For example, the command signal corresponds to control data for controlling the mobile display part 130. Thus, the mobile display part 130 performs a specific task according to, the command signal from the wireless communication interface module 360.

The control module 330 allows the AV signal including the video or audio signal input from the external memory 317 of the external device 315 through the external device interface module 327 to be output to the mobile display part 130 via the wireless communication interface module 360 in accordance with a play command of the AV signal received through the user input interface module 350 and stored in the external device 315 or control data transmitted from the mobile display part 130.

In this specification, if the power supply 410 is discharged at a predetermined time (t3), the control module 330 records and stored the AV signal corresponding to the discharged time or stores image screen information of the AV signal corresponding to the discharged time. In other words, the control module 330 allows the station part 120 to act as a digital video recorder (DVR) through the memory module 370.

In more detail, if the AV signal input through the signal input module 111 is a broadcast signal of one time transmitted from the terrestrial or cable broadcasting station, the control module 330 records and stores the AV signal.

If the AV signal input through the signal input module 111 is a video signal, which can be transmitted once again, for example, a video signal output from the external memory 317 (for example, DVD device continuously connected with the station part 130) or a video signal transmitted from the Internet server that can access corresponding contents through re-access, the control module 330 may not store the AV signal. In this case, the control module 330 may store information (for example, scene information or playback timing information within the contents) of the image screen output through the mobile display part 130 at the discharged timing point t3.

As a result, if the mobile display part 130 is charged again to display a predetermined image, the control module 330 transmits the recorded AV signal to the mobile display part 130 to allow the AV signal to be displayed by the mobile display part 130. Alternatively, if the mobile display part 130 is charged again to display a predetermined image, the control module 330 accesses an AV signal supply source (for example, the aforementioned Internet server), which provides corresponding contents, to receive the AV signal corresponding to the stored image screen information, based on the image screen information corresponding to the discharged time, and transmits the AV signal to the mobile display part 130.

The control module 330 can determine whether the power supply 410 of the mobile display part 130 has been discharged or charged, based on a discharge guide signal or a charge guide signal transmitted from the mobile display part 130. The discharge guide signal or the charge guide signal will be described in more detail with reference to FIG. 4 and FIG. 5.

Also, the recording and transmission operation of the AV signal of the control module 330 at the discharged time will be described in more detail with reference to FIG. 8 and FIG. 9.

The wireless communication interface module 360 is a communication module that can implement the aforementioned wireless communication network 140, and transmits and receives predetermined data to and from the mobile display part 130 in accordance with the wireless communication network. The wireless communication interface module 360 may be a communication module that satisfies the Wi-Fi Direct communication standard. The wireless communication interface module 360 transmits the AV signal (the AV signal may be a signal converted for a display format of the mobile display part 130 or may be an AV signal input through the signal input module 111) output from the control module 330 to the mobile display part 130.

The authentication module 380 receives authentication information for initially setting the wireless communication network (for example, Wi-Fi Direct) between the station part 120 and the mobile display part 130 from the mobile display part 130, and authenticates and set the wireless communication network based on the authentication information. Accordingly, the authentication module 380 allows the station part 120 to perform communication with the mobile display part 130 through the authenticated wireless communication network only.

The authentication information can include Internet Personal Identification Number (PIN) information of the mobile display part 130, which is given during manufacture, and ID generated based on the PIN information. The authentication module 380 authenticates connection of the wireless communication network based on the authentication information.

Figure 4:
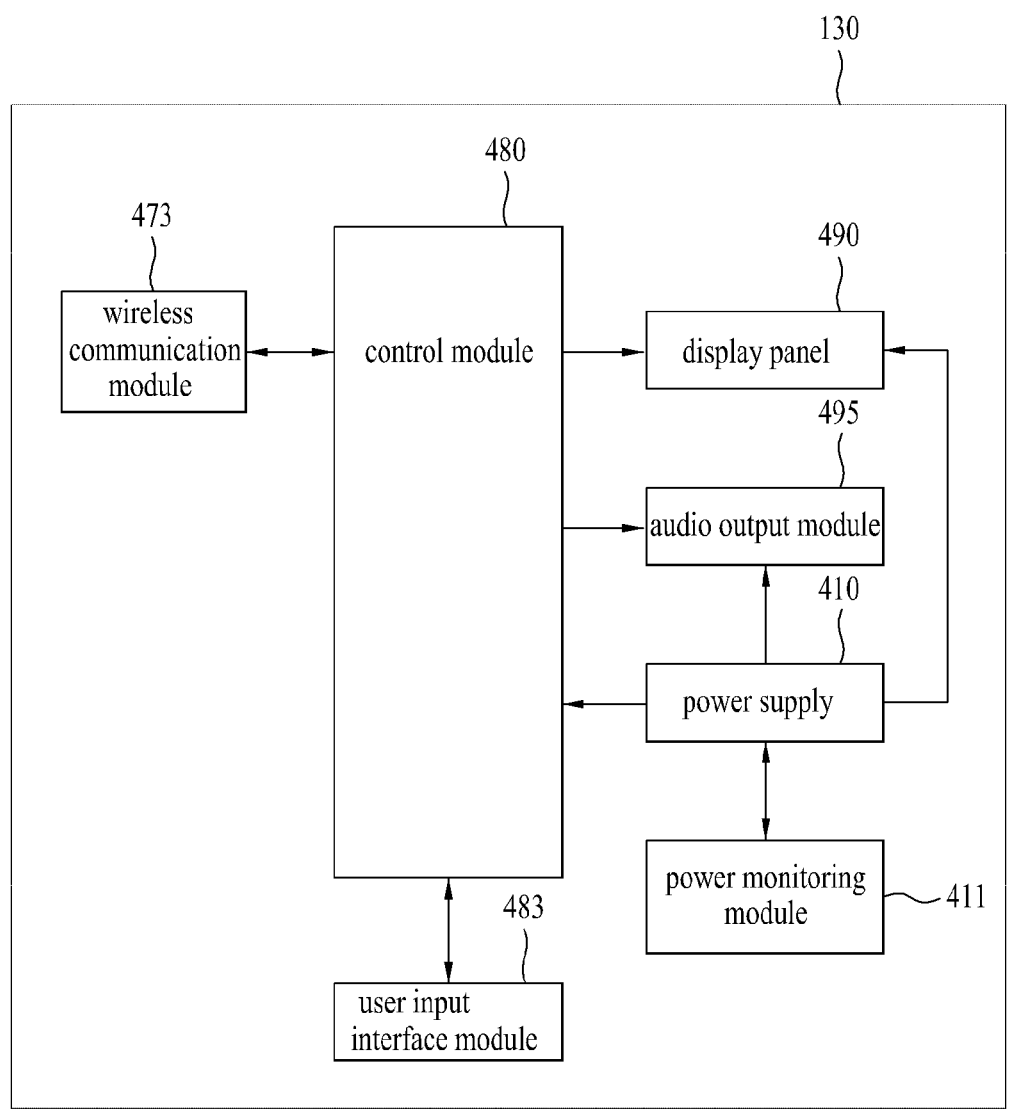
FIG. 4 is a block diagram illustrating a detailed example of a mobile display device of FIG. 1.

FIG. 4 is a block diagram illustrating a detailed example of a mobile display part of FIG. 1.

The mobile display part 130 includes a power supply 410, a wireless communication interface module 473, a memory module 478, a control module 480, a user input interface module 483, a display panel 490, and an audio output module 495.

The power supply 410 includes a charging battery charged and discharged, and supplies the power required to drive the mobile display part 120 to each module. In other words, by using the supplied power from the power supply 410, the mobile display part 130 receives the AV signal from the station part 120 and outputs an image corresponding to the AV signal. In this specification, as the mobile display part 130 includes a power supply 410 charged and discharged, it can drive the mobile display part 130 by conveniently moving the mobile display part to a desired position. Also, the image display apparatus can drive the mobile display part 130 regardless of the power supply source (for example, power line including outlet port).

In the same manner as the aforementioned wireless communication interface module 360, the wireless communication interface module 473 is a communication module that can implement the wireless communication network 140, and transmits and receives predetermined data to and from the station part 120 in accordance with the wireless communication network. The wireless communication interface module 473 may be a communication module that satisfies the Wi-Fi Direct communication standard.

The wireless communication interface module 473 receives the AV signal from the wireless communication interface module 360 and transmits the AV signal to the control module 480.

The control module 480 performs a control operation to display an image screen corresponding to the transmitted AV signal. In more detail, the control module 480 receives the AV signal transmitted through the wireless communication interface module 473. If the AV signal is not the signal converted for the display format, the control module 480 converts the AV signal to correspond to the display format that can be displayed by the display panel 490 and outputs the converted AV signal.

In this specification, the control module 480 monitors the power charging state of the power supply 410 in real-time, and transmits a discharge guide signal to the station part 120 if the power charged in the power supply 410 is discharged to reach a discharge limit value or less. The discharge limit value means a power charging amount of the power supply, which fails to drive the mobile display part 130 as the amount of the power charged in the power supply 410 is reduced to a certain value or less. The discharge limit value may be varied depending on options or models of the mobile display part 130 or the power supply 410.

For example, it is supposed that the mobile display part 130 is powered off if the value of the voltage that can be supplied depending on the power charging amount of the power supply 410 is less than a V (Volt) close to 0V. At this time, the discharge limit value can be set to a great value as much as predetermined offset at a V. Although the power supply 410 is not discharged to power the mobile display part 130 off, the discharge limit value can be set to a value that can power the mobile display part 130 off within a fast time (for example, several ten seconds). In other words, as the power charging amount before power-off is set to the discharge limit value, the discharge guide signal is transmitted to the station part 120 using the remaining power charging amount. Furthermore, the discharge guide signal is transmitted to the controller of the station part via the wireless communication interface module of the station part.

Also, if the power charging amount of the power supply 410 is discharged to reach the discharge limit value or less, the control module 480 outputs the discharge guide signal to the outside of the mobile display part 130, wherein the discharge guide signal can be recognized visually or auditorily. In this case, the mobile display part 130 can include an LED module and an alarm driver (not shown) such as alarm buzzer, wherein the LED module can output a visual or auditory alarm signal depending on the discharge guide signal. Accordingly, the user can easily recognize that the mobile display part 130 will be powered off due to discharge of the power supply 410 of the mobile display part 130.

Also, as the power supply 410 is charged after discharge, if the power amount charged in the power supply 410 reaches more than a charge limit value, the control module 480 transmits a charge guide signal to the station part 120. Alternatively, if the power supply 410 is fully charged (namely, if the power supply 410 is charged to reach the maximum power amount), the control module may transmit the charge guide signal to the station part 120. In this case, the charge limit value means a minimum power charging amount of the power supply 410, which can drive the mobile display part 130 to output a predetermined image. In other words, if the power supply 410 is charged at a level more than the charge limit value, it can supply the power that can drive the mobile display part 130. Furthermore, the charge guide signal is transmitted to the controller of the station part via the wireless communication interface module of the station part.

If the power charging amount of the power supply 410 is charged more than the charge limit value or if the power supply 410 is fully charged, the control module 480 outputs the charge guide signal, which can be recognized visually or auditorily, to the outside of the mobile display part 130. Accordingly, the user can easily recognize that the mobile display part 130 will be driven by charge of the power supply 410.

In addition, the control module 480 can control the whole operation of the mobile display part 130. For example, if the mobile display part 130 additionally includes a tuner 510 as will be described in FIG. 5, the control module 480 controls the tuner 510 to tune RF broadcasting corresponding to a channel selected by the user or a previously stored channel.

Since the other operation and configuration of the control module 480 are identical with or similar to those of the control module 330 described with reference to FIG. 30, their detailed description will be omitted. For example, the control module 480 processes the input AV signal and outputs the AV signal to the display panel 490.

Also, the detailed operation of the control module 480 will be described with reference to FIG. 8 and FIG. 9.

The memory module 478 stores the transmitted AV signal therein. Since the other operation and configuration of the memory module 478 are identical with or similar to those of the memory module 370 described with reference to FIG. 30, their detailed description will be omitted.

The display panel 490 converts an audio signal, a data signal, and an OSD signal, which corresponds to the AV signal processed by the control module 480, to R, G, signals, respectively, to generate a display panel driving signal. Examples of the display module 490 include PDP, LCD, OLED, flexible display, and 3D display.

In the mean time, a touch screen may be used as the display panel 490, whereby the display panel 490 can be used as an input module as well as an output device.

The audio output module 495 outputs the signal audio-processed by the control module 170, for example, stereo signal, 3.1 channel signal or 5.1 channel signal, as audio. Various types of speakers can be used as the audio output module 495.

Since the user input interface module 483 is identical with the user input interface module 350 described with reference to FIG. 3, its detailed description will be omitted.

In the mean time, in order to sense gesture of the user, the mobile display part 130 may further include a sensing module (not shown), which includes at least one of a touch sensor, an audio sensor, a position sensor, and an action sensor, as described above. The signal sensed by the sensing module may be transmitted to the control module 480 through the user input interface module 483.

Also, the mobile display part 130 may further include a camera module (not shown) taking the user. The image information taken by the camera module may be input to the control module 480.

Furthermore, a power monitoring module 411 periodically measures the power amount charged in the power supply 410, and determines whether the charged power amount is reduced to less then the aforementioned discharge limit value or increased more than the charge limit value. Also, the power monitoring module 411 can determine whether the power supply 410 has been fully charged. The power monitoring module 411 transmits the determined result to the control module 480. In more detail, the power monitoring module 411 measures and compares the power amount of the power supply 410 at a predetermined period and transmits the measured and compared result to the control module 480 at a predetermined period.

Also, if the power amount charged in the power supply 410 is reduced to less than the discharge limit value or increased more than the charge limit value, or only if the power supply 410 is fully charged, the power monitoring module 411 transmits the determined results to the control module 480.

The control module 480 can transmit at least one of the discharge guide signal and the charge guide signal to the station part 120 based on the monitoring result transmitted from the power monitoring module 411.

Figure 5:
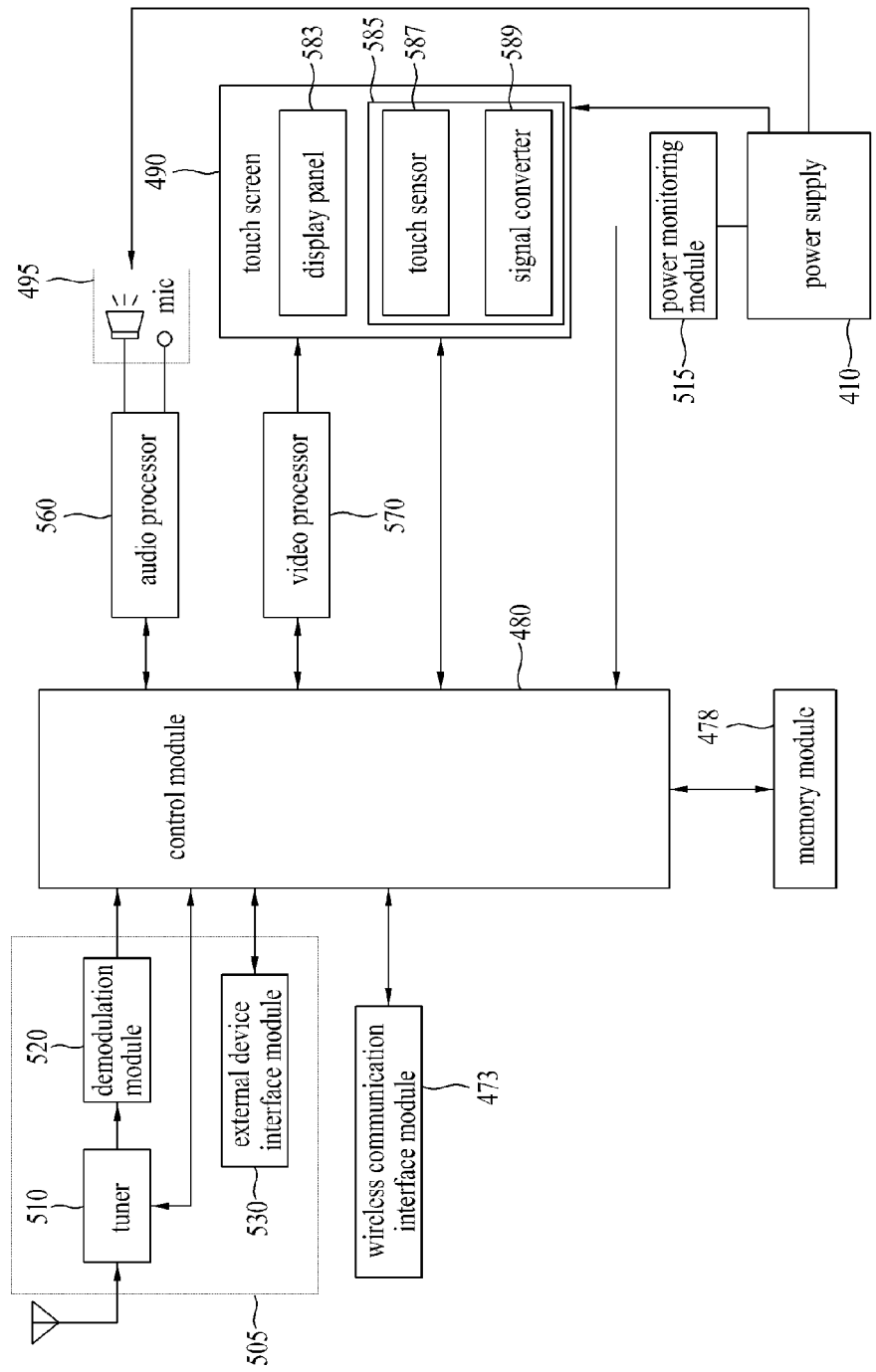
FIG. 5 is a block diagram illustrating another detailed example of a mobile display device of FIG. 1.

FIG. 5 is a block diagram illustrating another detailed example of a mobile display part of FIG. 1.

Referring to FIG. 5, although the mobile display part 140 of FIG. 5 is similar to that of FIG. 4, it may further include a power monitoring module 515, a signal input module 505, an audio processor 560, a video processor 570, and a touch screen 585 combined with the display panel 490. The signal input module 505 includes a tuner 510, a demodulation module 520, an external device interface module 530, and a network interface module (not shown).

Since the signal input module 505 is identical with the signal input module 111 of FIG. 3, its detailed description will be omitted.

In other words, as the mobile display part 130 according to one embodiment of the present invention includes the signal input module 505, it may receive a video signal by itself and display the received video signal.

The power monitoring module 515 periodically measures the power amount charged in the power supply 410, and determines whether the charged power amount is reduced to less then the aforementioned discharge limit value or increased more than the charge limit value. Also, the power monitoring module 515 can determine whether the power supply 410 has been fully charged. The power monitoring module 515 transmits the determined result to the control module 480. In more detail, the power monitoring module 515 measures and compares the power amount of the power supply 410 at a predetermined period and transmits the measured and compared result to the control module 480 at a predetermined period.

Also, if the power amount charged in the power supply 410 is reduced to less than the discharge limit value or increased more than the charge limit value, or only if the power supply 410 is fully charged, the power monitoring module 515 transmits the determined results to the control module 480.

The control module 480 can transmit at least one of the discharge guide signal and the charge guide signal to the station part 120 based on the monitoring result transmitted from the power monitoring module 515.

Also, it is supposed that the mobile display part 130 includes an alarm driver (not shown) (for example, LED lamp, alarm buzzer, etc.), which can be recognized auditorily or visually by the user. In this case, if the power amount charged in the power supply 410 is reduced less than the discharge limit value or increased more than the charge limit value, the control module 480 outputs the alarm signal, which can be recognized auditorily or visually by the user, through the alarm driver.

Also, the control module 480 can include a signal processor (not shown), which demultiplexes the AV signals or video signals input from the signal input module 505 or the wireless communication interface module 473 and processes the demultiplexed signals to generate and output signals for video or audio output. The signal processor will be described in more detail with reference to FIG. 6.

The audio processor 560 converts the audio signal processed by the control module 480 to a format that can be output by the audio output module 495 and outputs the converted signal. The audio processor 560 may encode the audio signal input through a mike (not shown) and output the audio signal to the control module 480 or the memory module 478.

The video processor 570 converts the video signal processed by the control module 480 to a format that can be output by the display panel 490 and outputs the converted signal.

The touch screen 585 is combined with the display panel 583, and includes a touch sensor 587 sensing whether a predetermined point on the display panel 583 has been touched and a signal processor 589 for transmitting the sensed touch signal to the control module. A display device such as LCD, PDP and OLED can be used as the display panel 583.

If an input event based on the touch of the user occurs, the touch sensor 587 detects variation of physical amount (resistance or capacitance) based on the input event to sense occurrence of the input event. Then, the touch sensor 587 transmits the physical amount of the sensed input event to the signal processor 589.

In this case, the input event means that the touch action of the user is input to the touch screen 585. The signal processor 589 converts variation of the physical amount based on the input event to a digital signal. The signal processor 589 determines whether the input event generated by variation of the physical amount is a touch event or a drag event. Also, the signal processor 589 measures a coordinate of the input event sensed by the touch sensor 587 and outputs the measured coordinate to the control module 480.

If the touch screen 585 is included in the mobile display part 130, the user can directly input a predetermined command to the mobile display part 130 by using the touch screen 585 even without a remote controller 200. As a result, the user can control the system 100 more conveniently.

The control module 480 according to the present invention determines the input event on the touch screen 585 and transmits control data to the station part 120 through the wireless communication interface module 473.

Also, the memory module 478 can store an action program of the mobile display part 130 and a program for providing a user interface based on the touch screen 585.

Figure 6:
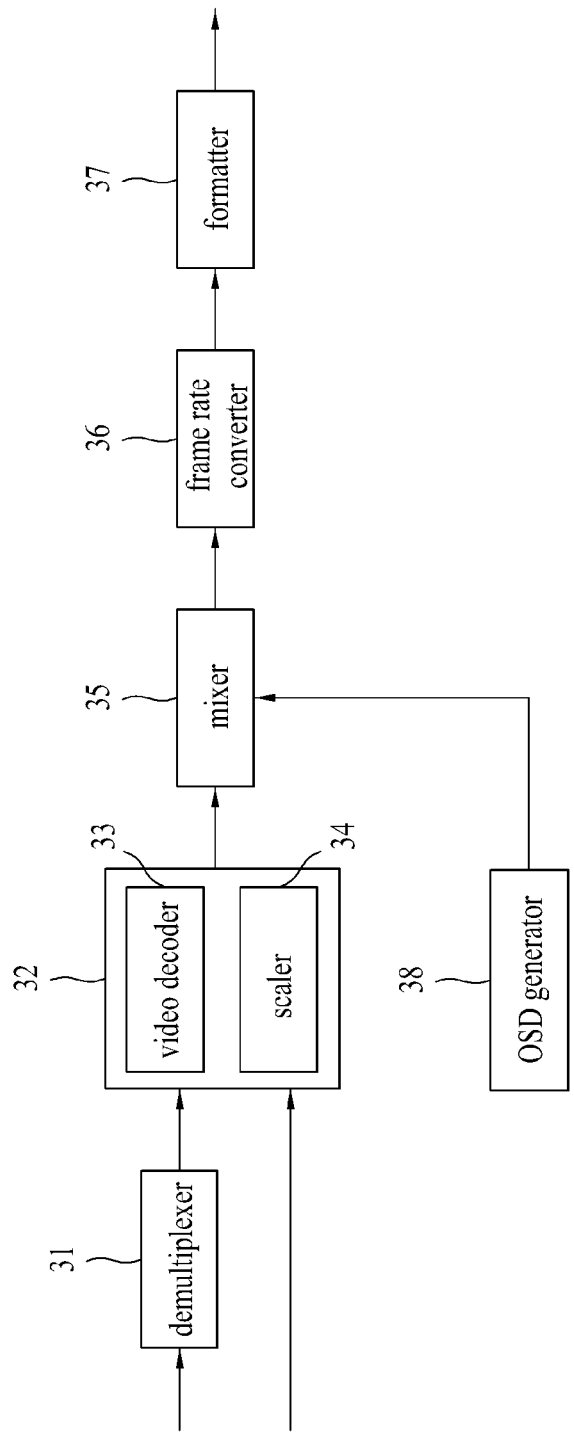
FIG. 6 is a block diagram illustrating a control module of FIG. 3, FIG. 4 or FIG. 5.

FIG. 6 is a block diagram illustrating a control module of FIG. 3, FIG. 4 or FIG. 5.

Referring to FIG. 6, the control module 330, 480 can convert the AV signal to correspond to the display format of the mobile display part 130. To this end, the control module 330, 480 can include a demultiplexer 31, a video processor 32, a mixer 35, a frame rate converter 36, a formatter 37, and an OSD generator 38.

The demultiplexer 31 demultipelxes input streams. For example, if MPEG-2 TS is input, the demultiplexer 31 demultiplexes the MPEG-2 TS and splits the demultiplexed MPEG-2 TS into a video signal, an audio signal and a data signal. In this case, the stream signal input to the demultiplexer 31 may be the stream signal based on the AV signal.

The video processor 32 can process the demultiplexed video signal. To this end, the video processor 32 includes a video decoder 33 and a scaler 34.

The video decoder 33 decodes the demultiplexed video signal, and the scaler 34 performs scaling to output resolution of the decoded video signal through the display panel 583.

The video decoder 33 may include decoders having various specifications.

For example, if the demultiplexed video signal is an encoded video signal of the MPEG-2 specification, it may be decoded by an MPEG-2 decoder.

Also, for example, if the demultiplexed video signal is an encoded video signal of the H.264 specification based on a Digital Multimedia Broadcasting (DMB) mode or DVB-H mode, it may be decoded by an H.264 decoder.

In the mean time, the video signal decoded by the video processor 32 is input to the mixer 35.

The OSD generator 38 generates an OSD signal in accordance with input of the user or by itself. For example, the OSD generator 38 may generate a signal for displaying various kinds of information on the screen of the display panel 583 in the form of graphic or text based on the user input signal or the control signal. The generated OSD signal may include various data such as a user interface screen of the mobile display part 130, a screen of various menus, widget, and icon.

For example, the OSD generator 38 may generate a signal for displaying broadcast information based on EPG or caption of broadcast video.

The mixer 35 mixes the OSD signal generated by the OSD generator 38 with the decoded video signal processed by the video processor 32. The mixed signal is provided to the formatter 37. As the decoded broadcast video signal or the external input signal is mixed with the OSD signal, the OSD may be overlaid on the broadcast video or the external input video.

The frame rate converter (FRC) 36 converts a frame rate of the input video. For example, the frame rate converter 36 converts a frame rate of 60 Hz to a frame rate of 120 Hz or 240 Hz. If the frame rate converter 36 converts the frame rate of 60 Hz to the frame rate of 120 Hz, a first frame may be inserted between another first frame and the second frame, or a third frame predicted from the first frame and the second frame may be inserted between the first frame and the second frame. If the frame rate converter 36 converts the frame rate of 60 Hz to the frame rate of 240 Hz, three same frames may be inserted between another first frame and the second frame, or the third frame predicted from the first frame and the second frame may be inserted between the first frame and the second frame. In the mean time, the input frame rate may be maintained without separate conversion.

The formatter 37 receives an output signal of the frame rate converter 36, changes a format of the signal to conform to the display panel 583, and then outputs the changed format. For example, the formatter 37 may output R, G, B data signals. The R, G, B data signals may be output by low voltage differential signaling (LVDS) or mini-LVDS.

FIG. 7 is a diagram illustrating a platform structure of a station part according to the embodiment of the present invention.

A platform of the station part 120 according to the embodiment of the present invention may include OS based software to perform the aforementioned various operations.

First of all, referring to (a) of FIG. 7, a platform of the station part 120 according to the embodiment of the present invention is a split type platform and can be designed in such a manner that it is split into a legacy system platform 700 and a smart system platform 705. An OS kernel 710 may be used in common for the legacy system platform 700 and the smart system platform 705.

The legacy system platform 700 includes a driver 720 on the OS kernel 710, a middleware 730, and an application layer 750.

In the mean time, the smart system platform 705 includes a library 735 on the OS kernel 710, a framework 740, and an application layer 755.

The OS kernel 710 is a core of the operating system, and can perform at least one of driving of a hardware driver, security of hardware and processor in the station part 120, efficient management of system resources, memory management, interface for hardware based on hardware abstraction, multi-process, and schedule management based on multi-process when the station part 120 is driven. In the mean time, the OS kernel 710 may further perform power management.

The hardware driver in the OS kernel 710, for example, may include at least one of a display driver, a Fi driver, a Bluetooth driver, a USB driver, an audio driver, a power manager, a binder driver, and a memory driver.

Also, the hardware driver in the OS kernel 710 may further include a character device driver, a block device driver, and a network device driver as drivers for hardware devices therein. The block device driver may need a buffer equivalent to unit size in accordance with data transmission of a specific block unit. The character device driver may not need a buffer due to data transmission in a basic data unit, i.e., character unit.

As described above, the OS kernel 710 can be implemented as the kernel based on various operating systems such as unix (linux) based operating system and window based operating system. Also, the OS kernel 710 is an opened OS kernel, and can be used generally by other electronic devices.

The driver 720 is located between the OS kernel 710 and the middleware 730, and drives the device for operation of the application layer 750 together with the middleware 730. For example, the driver 720 may include drivers such as a micom in the station part 120, a display module, a graphic processing unit (GPU), a frame rate converter (FRC), a general purpose input/output pin (GPIO), HDMI, system decoder or demultiplexer (SDEC), video decoder (VDEC), audio decoder (ADEC), a personal video recorder (PVR), and an inter-integrated circuit (I2C). These drivers interact with the hardware driver in the OS kernel 710.

Also, the driver 720 may further include a driver of a remote controller 200, especially a spatial remote controller which will be described later. The driver of the spatial remote controller may be provided in the OS kernel 710 or the middleware 730 in addition to the driver 720.

The middleware 730 is located between the OS kernel 710 and the application layer 750, and serves as a medium that allows data to be exchanged between hardware and software. In this case, a standardized interface can be provided, various environments can be supported, and mutual interaction between tasks of different systems can be performed.

Examples of the middleware 730 in the legacy system platform 700 include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The application layer 750 on the middleware 730, namely the application layer 750 in the legacy system platform 700 may include a user interface application on various menus in the station part 120. The application layer 750 on the middleware 730 can be edited by selection of the user, and can be updated through the network. This application layer 750 enables the user to input a desired menu of various user interfaces in accordance with the input of the remote controller 200 during viewing broadcasting image.

Also, the application layer 750 in the legacy system platform 700 may further include at least one of TV guide application, Bluetooth application, reservation application, digital video recorder (DVR) application, hot key application.

In the mean time, the library 735 in the smart system platform 705 is located between the OS kernel 710 and the framework 740, and can form the base of the framework 740. For example, the library 735 includes a security library, a web engine library, a libc (c library), and a media library such as video and audio formats, wherein the security library includes secure socket layer (SSL), the web engine library includes WebKit, and the media library includes media framework. The library 735 can be made based on C or C++, and can be exposed to a developer through the framework 740.

The library 735 may include a runtime 737 that includes a core java library and a virtual machine (VM). The runtime 737 forms the base of the framework 740 together with the library 735.

The virtual machine (VM) may be a virtual machine that enables a plurality of instances, i.e., multi-tasking. The virtual machine (VM) may be allocated in accordance with each application in the application layer 755. At this time, for schedule adjustment and interconnection between the plurality of instances, the binder driver (not shown) in the OS kernel 710 may be driven.

In the mean time, the binder driver and the runtime 737 can connect java based application with C based library.

The binder driver and the runtime 737 can correspond to middleware of the legacy system.

The framework 740 in the smart system platform 705 includes a program based on the application in the application layer 755. The framework 740 is compatible with any one of the applications and enables reuse, movement or exchanges of components. The framework 740 may include a support program, and a program that compiles other software elements. For example, the framework 740 may include a resource manager, an activity manager related to activities of the application, a notification manager, and a content provider for briefing of information shared between the applications. The framework 740 can be made based on JAVA.

The application layer 755 on the framework 740 includes various programs that can be driven and displayed in the station part 120. For example, the application layer 755 may include core application that includes at least one of email, short message service (SMS), calendar, map, and browser. This application layer 755 can be made based on JAVA.

Also, the application layer 755 may be divided into an application 765 that can be stored in the station part 120 and cannot be deleted by the user and an application 775 that can be downloaded through the external device or network and can be installed or deleted freely by the user.

Internet phone service, video on demand (VOD) service, web album service, social networking service (SNS), location based service (LBS), map service, web search service and application search service may be performed by network access through the application in the application layer 755. Also, various functions such as games and schedule management may be performed through the application in the application layer 755.

Next, referring to (b) of FIG. 7, a platform of the station part 120 according to the embodiment of the present invention is an integrated type platform and includes an OS kernel 760, a driver 770, a middleware 780, a framework 785, and an application layer 790.

The platform of (b) of FIG. 7 is different from that of (a) of FIG. 7 in that the library 735 illustrated in (a) of FIG. 7 is omitted and the application layer 790 is an integrated layer. The driver 770 and the framework 785 correspond to those of (a) of FIG. 7.

In the mean time, the platform of (b) of FIG. 7 can be designed such that the library 735 illustrated in (a) of FIG. 7 is incorporated into the middleware 780 illustrated in (b) of FIG. 7. In other words, the middleware 780 includes legacy system middleware and display system middleware. The legacy system middleware may include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware. The display system middleware may include security library, web engine library, libc, and media library, wherein the security library includes secure socket layer (SSL), the web engine library includes WebKit, and the media library includes media framework. The display system middleware may further include runtime described above.

The application layer 790 in the legacy system may include menu application, TV guide application, and reservation application while the application layer 790 in the display system may include email, short message service (SMS), calendar, map, and browser.

In the mean time, the application layer 790 may be divided into an application 565 that can be stored in the station part 120 and cannot be deleted by the user and an application 790 that can be downloaded through the external device or network and can freely be installed or deleted by the user.

The aforementioned platforms of (a) and (b) of FIG. 7 can be used generally for various electronic devices as well as the image display apparatus. In the mean time, the platforms of (a) and (b) of FIG. 7 may be stored or loaded in the memory module 370 (or 478) or the control module 330 (or 480), or separate processor (not shown). Also, a separate application processor (not shown) for implementing application may further be provided.

Hereinafter, the operation of the station part 120 according to one embodiment of the present invention will be described in more detail with reference to FIG. 8 and FIG. 9.

Figure 8:
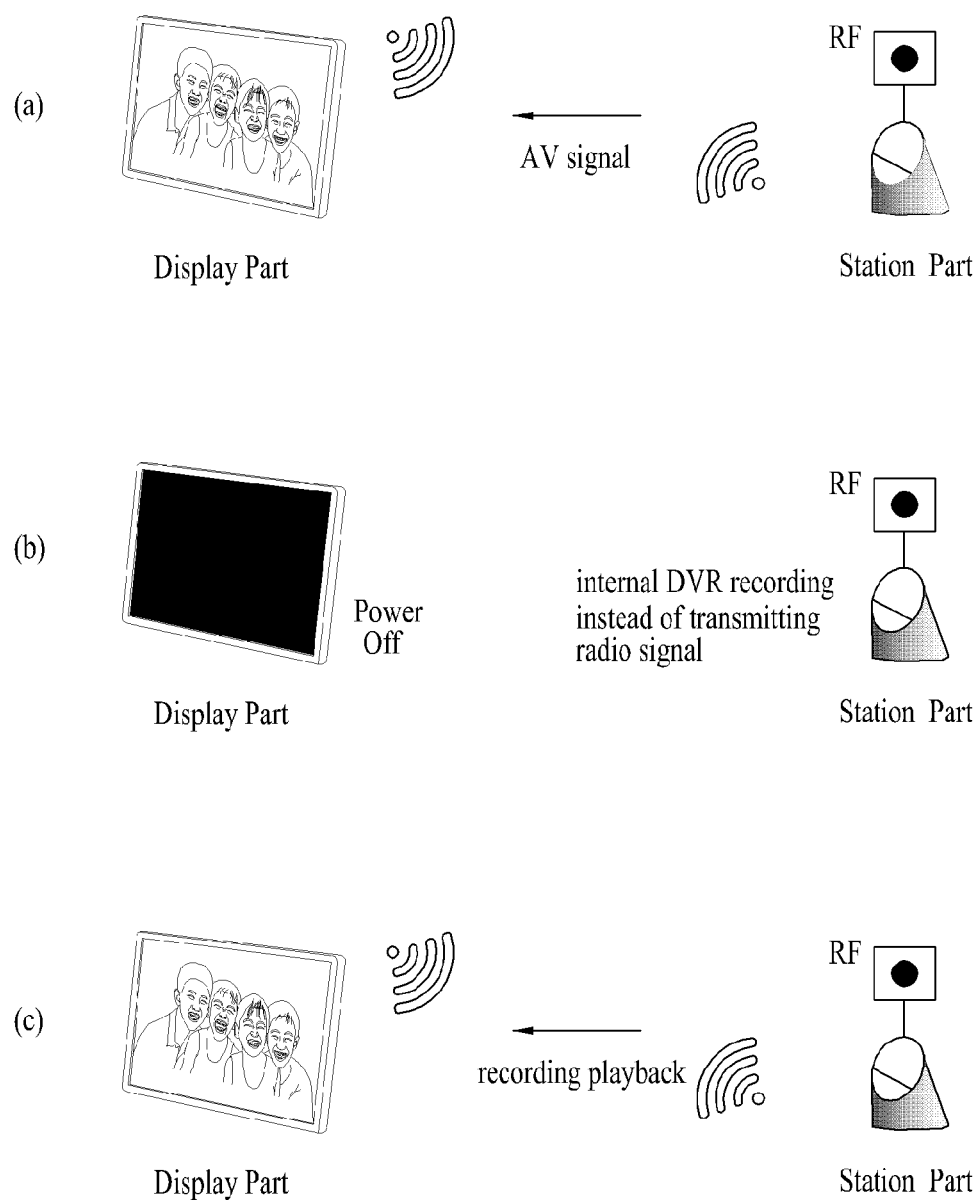
FIG. 8 is a diagram illustrating an operation performed by a system according to one embodiment of the present invention.

FIG. 8 is a diagram illustrating an operation performed by a system according to one embodiment of the present invention.

Figure 9:
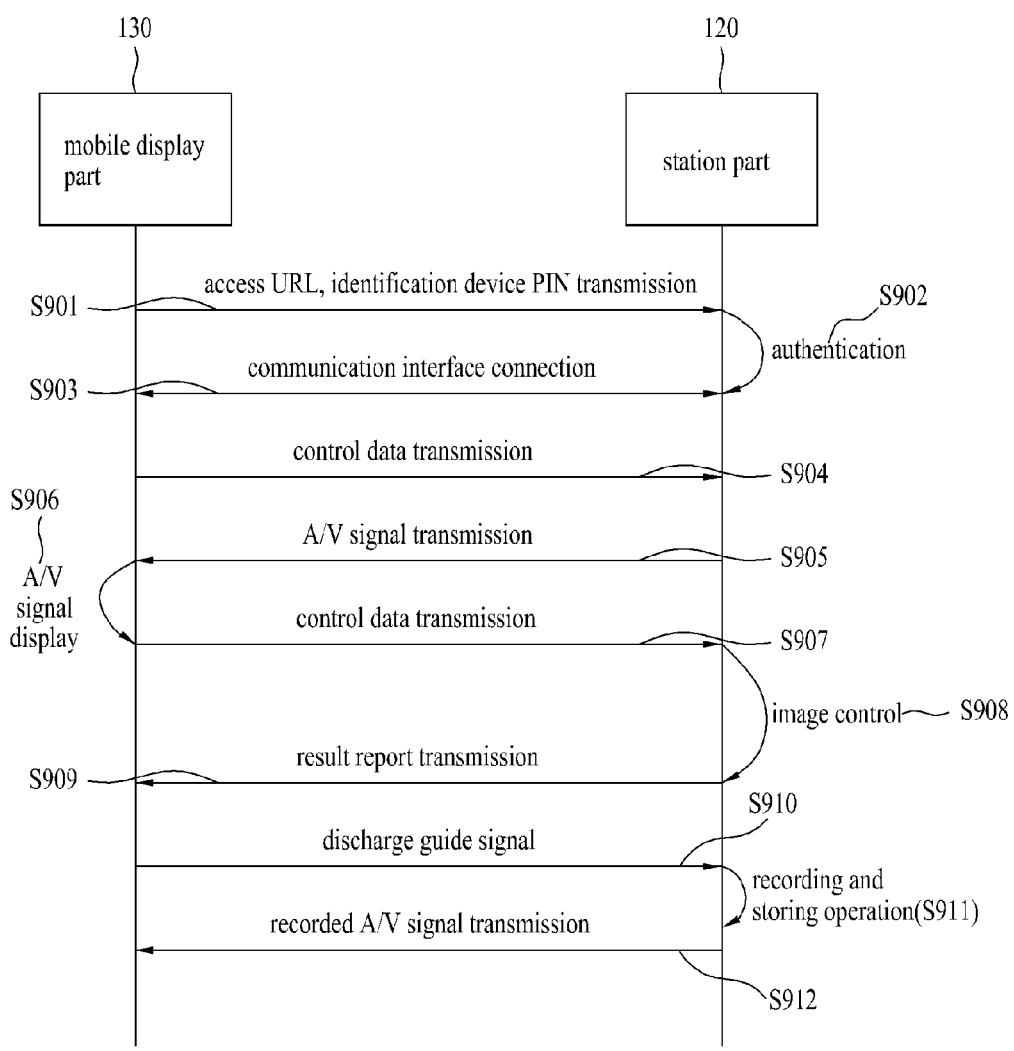
FIG. 9 is a flow chart illustrating an operation performed by a system according to one embodiment of the present invention.

FIG. 9 is a flow chart illustrating an operation performed by a system according to one embodiment of the present invention.

Referring to (a) of FIG. 8 and FIG. 9, the control module 130 of the station part 120 performs a control operation to allow the AV signal input from the AV signal supply source 170 to be transmitted to the mobile display part 130 through the wireless communication network 140 (S905).

Also, before the AV signal is transmitted, in order to initially set the wireless communication network (for example, Wi-Fi Direct) between the mobile display part 130 and the station part 120 of the system 100, the mobile display part 130 transmits authentication information (universal resource locator (URL) information for accessing an authentication server, PIN information, etc.) (S901). The authentication information includes Internet Personal Identification Number (PIN) information of the mobile display part 130, which is given during manufacture, and ID generated based on the PIN information. Also, the authentication information may be transmitted from a service provider server that provides a wireless communication network (for example, Wi-Fi Direct) service.

The authentication module 380 of the station part 120 authenticates connection of the wireless communication network based on the transmitted authentication information (S902).

As a result, the wireless communication interface (or wireless communication network) based on the predetermined wireless communication specification (for example, Wi-Fi Direct specification) is set between the mobile display part 130 and the station part 120 (S903).

In other words, as connection and setup of the wireless communication network between the mobile display part 130 and the station part 120 is initially performed once through the steps S901 to S903, the mobile display part 130 and the station part 120 can transmit and receive data to and from each other without additional setup.

Also, the mobile display part 130 transmits control data to the station part 120 to request a predetermined action or command (S904). The control data can be generated as the user inputs a key signal corresponding to a predetermined command through manipulation of the remote controller 200 or the touch screen 585.

For example, if the user requests the mobile display part 130 to watch a program transmitted from terrestrial broadcasting (for example, CH7) by using the remote controller 200 or the touch screen 585 (i.e., if the user requests channel change to CH7), the control module 480 of the mobile display part 130 generates control data corresponding to the request and transmits the control data to the wireless communication interface module 360 of the station part 120.

Then, the control module 330 of the station part 120 performs a control operation to allow the AV signal corresponding to the requested control data to be input from the AV signal supply source 170, and transmits the input AV signal to the mobile display part 130 (S905). For example, the control module 330 of the station part 120 tunes a frequency band corresponding to CH7 of the signals transmitted form the terrestrial broadcasting station and receives a broadcast signal transmitted from CH7. And, the control module 330 of the station part 120 transmits the received broadcast signal to the mobile display part 130 as the AV signal.

The mobile display part 130 displays an image (i.e., program transmitted from CH7) corresponding to the transmitted AV signal (S906).

Also, the user can control playback of the image corresponding to the AV signal by manipulating the remote controller 200. For example, the user can request channel change from CH7 to CH9 through the remote controller 200. Then, the control module 480 of the mobile display part 120 transmits control data (for example, data requesting channel change from CH7 to CH9) to the station part 120 (S907).

The control module 330 of the station part 120 performs a control operation of playback of the image or a control operation of the AV signal supply source 170 in accordance with the control data transmitted in the step S907 (S908). For example, if the control module 330 of the station part 120 receives the control data requesting channel change from CH7 to CH9, it can perform channel change in such a manner that it tunes the frequency band corresponding to CH9 among the signals transmitted from the terrestrial broadcasting station and receives the broadcast signal transmitted from CH9.

Also, the control module 330 of the station part 120 transmits the result of the control operation performed in the step S908 to the mobile display part 130 (S909). In the aforementioned example, the control module 330 of the station part 120 can transmit the result report "channel changing to CH9" or "channel change to CH9 has been successfully performed".

Also, the control module 480 of the mobile display part 130 can perform a control operation to allow an on screen display (OSD) to be output on the display screen based on the result report transmitted in the step S909, whereby the user can recognize the result report. In the aforementioned example, the control module 330 of the station part 120 can perform a control operation to allow the OSD such as "channel changing to CH9" or "channel change to CH9 has been successfully performed" to be output.

Referring to (b) of FIG. 8, as the power charged in the power supply 410 of the mobile display part 130 is discharged to reach a value less than the discharge limit value, the mobile display part 130 is powered off (S910).

If the power charged in the power supply 410 reaches the discharge limit value (or a value close to the discharge limit value), the control module 480 of the mobile display part 130 transmits the discharge guide signal to the station part 120 before the mobile display part 130 is powered off (not shown).

Also, if the power charged in the power supply 410 reaches the discharge limit value (or a value close to the discharge limit value), the control module 480 of the mobile display part 130 performs a control operation to allow the OSD, which includes a message indicating discharge of the power supply 410, to be output to the display panel 490.

The station part 120 records the AV signal transmitted from the AV signal supply source 170 from the time when the power supply 410 is discharged, based on the discharge guide signal, or stores image screen information of the AV signal corresponding to the discharged time (S911). In this case, the discharged time means the time when the mobile display part 130 fails to display the image corresponding to the AV signal due to discharge of the power supply 410. Also, the discharged time may be the time when the discharge guide signal is transmitted or the time when a predetermined time passes from the time when the discharge guide signal is transmitted.

Also, the control module 330 of the station part 120 can record the AV signal or store the image screen information after a predetermined time passes from the time when the discharge guide signal is transmitted. For example, since the mobile display part 130 can be driven depending on product options of the system 100 for several seconds to several tens seconds after the discharge guide signal is transmitted, the control module 330 may record the AV signal from the time when about 10 seconds pass after the discharge guide signal is transmitted.

In more detail, if the AV signal supply source 170 inputs the AV signal corresponding to predetermined contents from the time t1, and if the mobile display part 130 is powered off as the power supply 410 is discharged at t3 (discharge time) after t1, the control module 330 of the station part 120 controls the AV signal input from t3 to be recorded in the memory module 370. In this case, the recording operation can be performed until a predetermined content output from the AV signal supply source 170 ends or until the power supply 410 is charged more than the charge limit value or is fully charged. In more detail, the recording operation can be performed until the charge guide signal is transmitted from the station part 120 or the predetermined content ends.

As described above, if the AV signal input through the signal input module 111 is a broadcast signal of one time transmitted from the terrestrial or cable broadcasting station, the control module 330 records and stores the AV signal. If the AV signal input through the signal input module 111 is a video signal, which can be transmitted once again, the control module 330 can store information (for example, scene information or playback timing information) of the image screen output through the mobile display part 130 at the discharge time t3 without storing the AV signal. In this case, an example of the AV signal, which can be transmitted once again, includes a video signal output from the external memory 317 (for example, DVD device continuously connected with the station part 130) or a video signal transmitted from the Internet server that can access corresponding contents at any time through re-access.

Referring to (c) of FIG. 8 and the step S912 of FIG. 9, if the power supply 410 is fully charged after the discharge time or is charged more than the charge limit value, the control module 330 of the station part 120 controls the AV signal or the image screen information, which is recorded in the step S911, to be transmitted to the mobile display part 130 (S912). The control module 330 of the station part 120 can determine whether the power supply 410 has been fully charged or has been charged more than the charge limit value, based on the charge guide signal transmitted from the control module 480 of the mobile display part 130.

In more detail, if the mobile display part 130 is charged again to display a predetermined image, the control module 330 transmits the recorded AV signal to the mobile display part 130 to allow the AV signal to be displayed by the mobile display part 130. Alternatively, the control module 330 accesses the AV signal supply source (for example, the aforementioned Internet server), which provides corresponding contents, to receive the AV signal corresponding to the stored image screen information, based on the image screen information corresponding to the discharged time, and transmits the AV signal to the mobile display part 130.

The step S912 can be performed automatically.

Alternatively, the step S912 may be performed depending on selection of the user. In more detail, the control module 330 of the station part 120 receives the charge guide signal, and controls an OSD, which identifies whether to display the recorded AV signal, to be output through the mobile display part 130. The control module 330 of the station part 120 performs the operation of the step S912 if the control data input to the mobile display part 130 in accordance with the OSD output are the control data requesting transmission of the recorded AV signal to the mobile display part 130.

The control data at the aforementioned step S904 or S907 are generated by manipulation of the remote controller 200 or touch of the touch screen 585. The generated control data are transmitted to the station part 120. Hereinafter, the operation and the detailed configuration of the remote controller 200 will be described in more detail with reference to FIG. 10 and FIG. 11.

Figure 10:
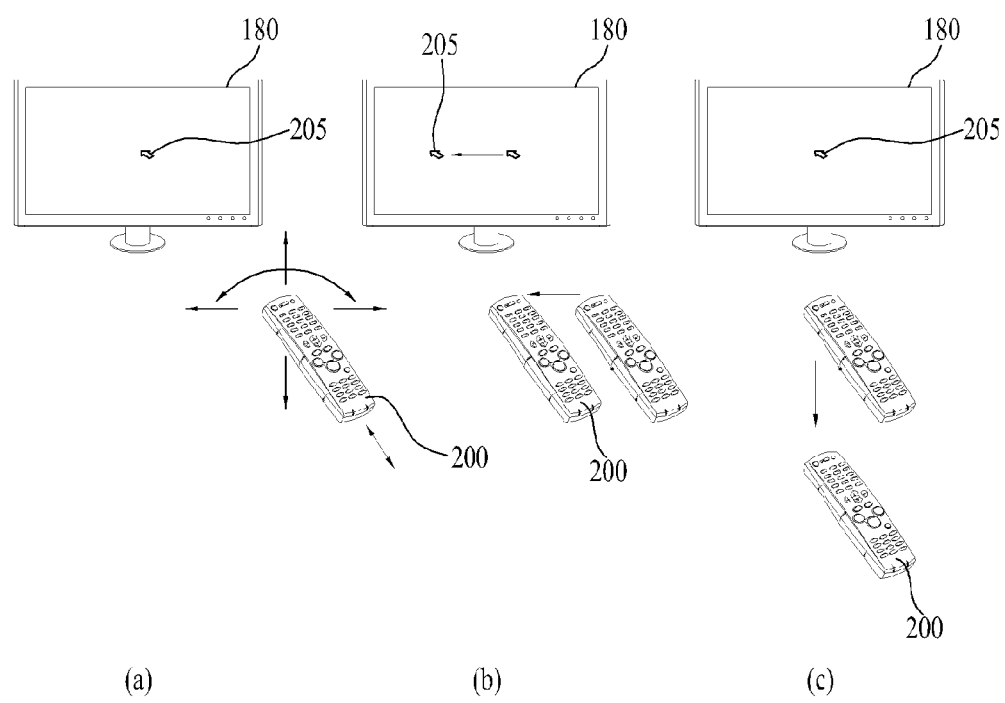
FIG. 10 is a diagram illustrating an operation for remotely controlling a display part of FIG. 1.

FIG. 10 is a diagram illustrating an operation for remotely controlling an image display apparatus of FIG. 1.

Referring to FIG. 10, the remote controller 200 can transmit and receive a signal to and from the mobile display part 130 (in more detail, user input interface module 483) of the system 100 in accordance with the RF communication standard or the IR communication standard. The mobile display part 130 may further include a communication module (not shown) to transmit and receive a predetermined signal to and from the remote controller 200. In more detail, the mobile display part 130 may further include an IR communication module or an RF communication module. The signal received by the remote controller 200 is transmitted to the control module 480. Also, the control module 480 generates control data in accordance with the signal transmitted from the remote controller 200, and transmits the generated control data to the user input interface module 350 of the station part 120. The transmitted control data can be used to control the operation of the station part 120.

Examples of the remote controller 200 include a button type remote control provided with a plurality of hard key buttons, a touch screen remote controller that can output soft keys, and a motion remote controller (or spatial remote controller) operated to correspond to motion.

(a) of FIG. 10 illustrates that a pointer 205 corresponding to the remote controller 200 is displayed in the mobile display part 130 (in more detail, display panel 490).

The user can move or rotate the remote controller 200 in up and down direction, left and right direction (b of FIG. 10) and front and rear direction (c of FIG. 10). The pointer 205 displayed in the display module 180 of the image display apparatus corresponds to motion of the remote controller 200. Since the corresponding pointer 205 moves in accordance with motion on 3D space as shown, the remote controller 200 may be referred to as a spatial remote controller.

(b) of FIG. 10 illustrates that, if the user moves the remote controller 200 to the left, the pointer 205 displayed in the image display apparatus moves to the left correspondingly. Information on motion of the remote controller 200, which is sensed by a sensor of the remote controller 200, is transmitted to the image display apparatus 180. The image display apparatus 180 can obtain a coordinate of the pointer 205 from the information on motion of the remote controller 200. The image display apparatus 180 can display the pointer 205 to correspond to the above coordinate.

(c) of FIG. 10 illustrates that the user moves the remote controller 200 to be far away from the mobile display part 130 in a state that the user pushes a specific button of the remote controller 200. In this case, a zone selected in the mobile display part 130 corresponding to the pointer 205 is displayed through zoom-in. On the contrary, if the user moves the remote controller 200 to be close to the mobile display part 130, the zone selected in the mobile display part 130 corresponding to the pointer 205 is displayed through zoom-out. In the mean time, if the remote controller 200 becomes far away from the mobile display part 130, the selected zone may be subjected to zoom-out. If the remote controller 200 becomes close to the mobile display part 130, the selected zone may be subjected to zoom-in.

In the mean time, in a state that the specific button of the remote controller 200 is pushed, up and down motion and left and right motion may not be recognized. In other words, if the remote controller 200 moves to be far away from or close to the mobile display part 130, front and rear motion may be recognized only without recognition of up and down motion and left and right motion. In a state that the specific button of the remote controller 200 is not pushed, the pointer 205 is only moved in accordance with up and down motion and left and right motion of the remote controller 200.

Motion speed or motion direction of the pointer 205 may correspond to that of the remote controller 200.

In this specification, the pointer means an object displayed in the mobile display part 130 to correspond to the operation of the remote controller 200. Accordingly, in addition to an arrow shape illustrated by the pointer 205, various shaped objects may be provided. For example, examples of the pointer may include dot, cursor, prompt, and thick outline. The pointer may be displayed to correspond to any one point of a horizontal axis and a vertical axis on the mobile display part 130, or may be displayed to correspond to a plurality of points such as line and surface.

Figure 11:
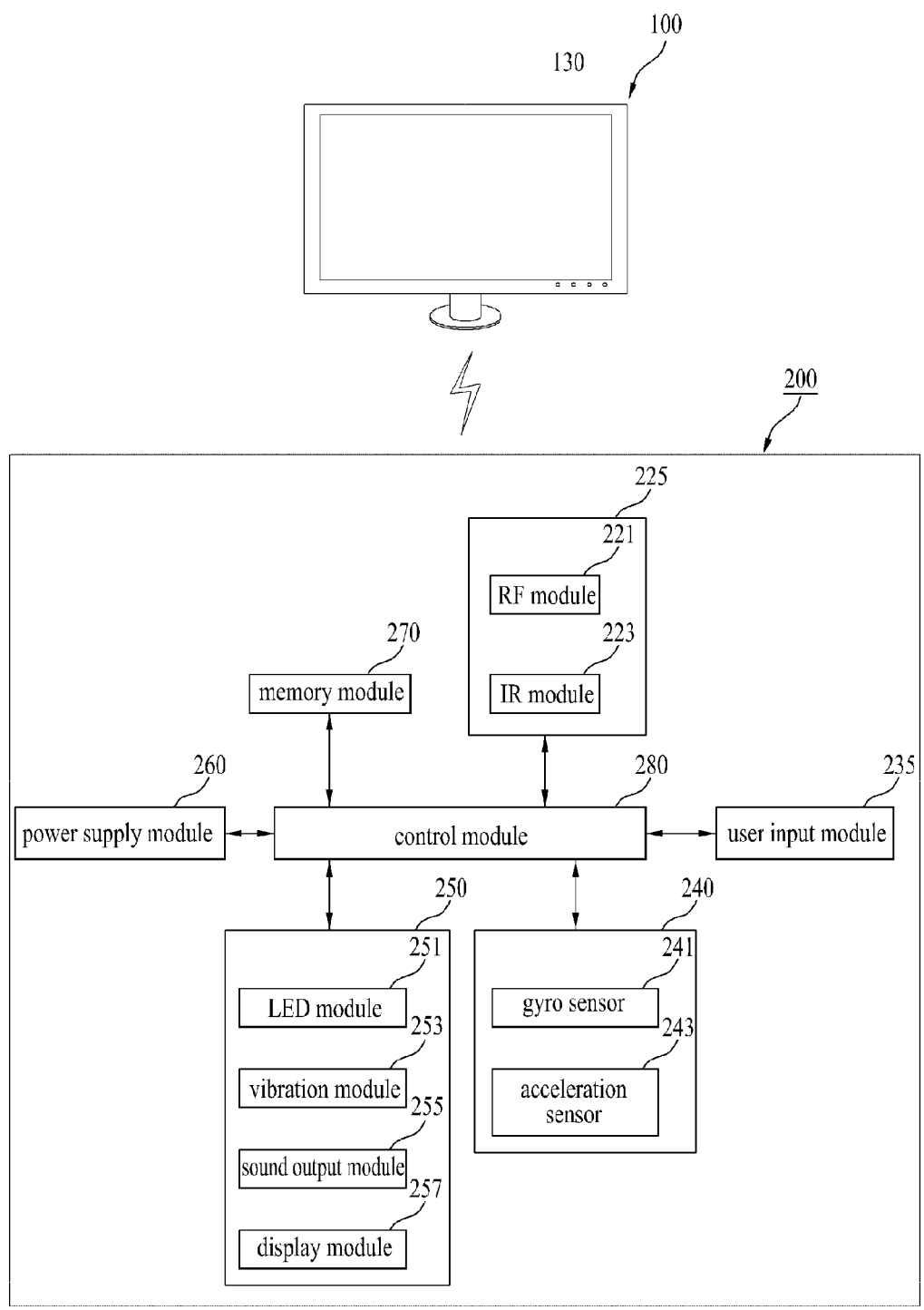
FIG. 11 is a block diagram illustrating a remote controller of FIG. 10.

FIG. 11 is a block diagram illustrating a remote controller of FIG. 10.

Referring to FIG. 11, the remote controller 200 includes a wireless communication module 225, a use input module 235, a sensor module 240, an output module 250, a power supply module 260, a memory module 270, and a control module 280.

The wireless communication module 225 transmits and receives a signal to and from the image display apparatus. In this embodiment, the remote controller 200 may include RF module 221 that can transmit and receive a signal to and from the image display apparatus 100 in accordance with the RF communication standard. The remote controller 200 may further include IR module 223 that can transmit and receive a signal to and from the image display apparatus 100 in accordance with the IR communication standard.

In this embodiment, the remote controller 200 transmits a signal, which includes information on its motion, to the mobile display part 130 of the image display apparatus 100 through the RF module 221. Also, the remote controller 200 can receive the signal transmitted from the image display apparatus 100 through the RF module 221. Also, the remote controller 200 can transmit a command on power on/off, channel change and volume change to the image display apparatus 100 through the IR module 223 if necessary. Also, the remote controller 200 may transmit and receive a predetermined signal to and from the station part 120.

The user input module 235 can include a key pad, a button, a touch pad, or a touch screen. The user can input the command related to the image display apparatus 100 to the remote controller 200 by manipulating the user input module 235. If the user input module 235 includes a hard key button, the user can input the command related to the image display apparatus 100 to the remote controller 200 through a push action of the hard key button. If the user input module 235 includes a touch screen, the user can input the command related to the image display apparatus 100 to the remote controller 200 by touching a soft key of the touch screen. Also, the user input module 235 may include various kinds of input means, which can be manipulated by the user, such as scroll key and jog key, within the range that does not limit the scope of the present invention.

The sensor module 240 may include a gyro sensor 241 or an acceleration sensor 243. The gyro sensor 241 can sense the information on motion of the remote controller 200. For example, the gyro sensor 241 can sense the information on motion of the remote controller 200 based on x, y and z axes. The acceleration sensor 243 can sense information on motion speed of the remote controller 200. In the mean time, the sensor module 240 may further include a distance sensor that senses the distance between the mobile display part 130 and the remote controller 200.

The output module 250 can output the video or audio signal corresponding to the manipulation of the user input module 235 or the signal transmitted from the image display apparatus 100. The user can recognize whether the user input module 235 has been manipulated or whether the image display apparatus 100 has been controlled, through the output module 250.

For example, if the user input module 235 is manipulated or if the output module 250 transmits and receives a signal to and from the image display apparatus 100 through the wireless communication module 225, the output module 250 may include an LED module 251 for lighting, a vibration module 253 that generates vibration, a sound output module 255 that outputs sound, or a display module 257 that outputs image.

The power supply module 260 supplies the power to the remote controller 200. If the remote controller 200 does not move for a predetermined time, the power supply module 260 can save the power by stopping power supply. The power supply module 260 can resume power supply if a predetermined key provided in the remote controller 200 is manipulated.

The memory module 270 may store various kinds of programs and application data required for control or operation of the remote controller 200. If the remote controller 200 transmits and receives a signal to and from the image display apparatus 100 through the RF module 221, the remote controller 200 and the image display apparatus 100 transmit and receive the signal to and from each other through a predetermined frequency band. The control module 280 of the remote controller 200 can store information on the frequency band, through which the signal can be transmitted to and received from the image display apparatus 100 paired with the remote controller 200, in the memory module 270, and can refer to the stored information.

The control module 280 controls all matters related to control of the remote controller 200. The control module 280 can transmit the signal corresponding to predetermined key manipulation of the user input module 235 or the signal corresponding to motion of the remote controller 200, which is sensed by the sensor module 240, to the image display apparatus 100 through the wireless communication module 225.

Figure 12:
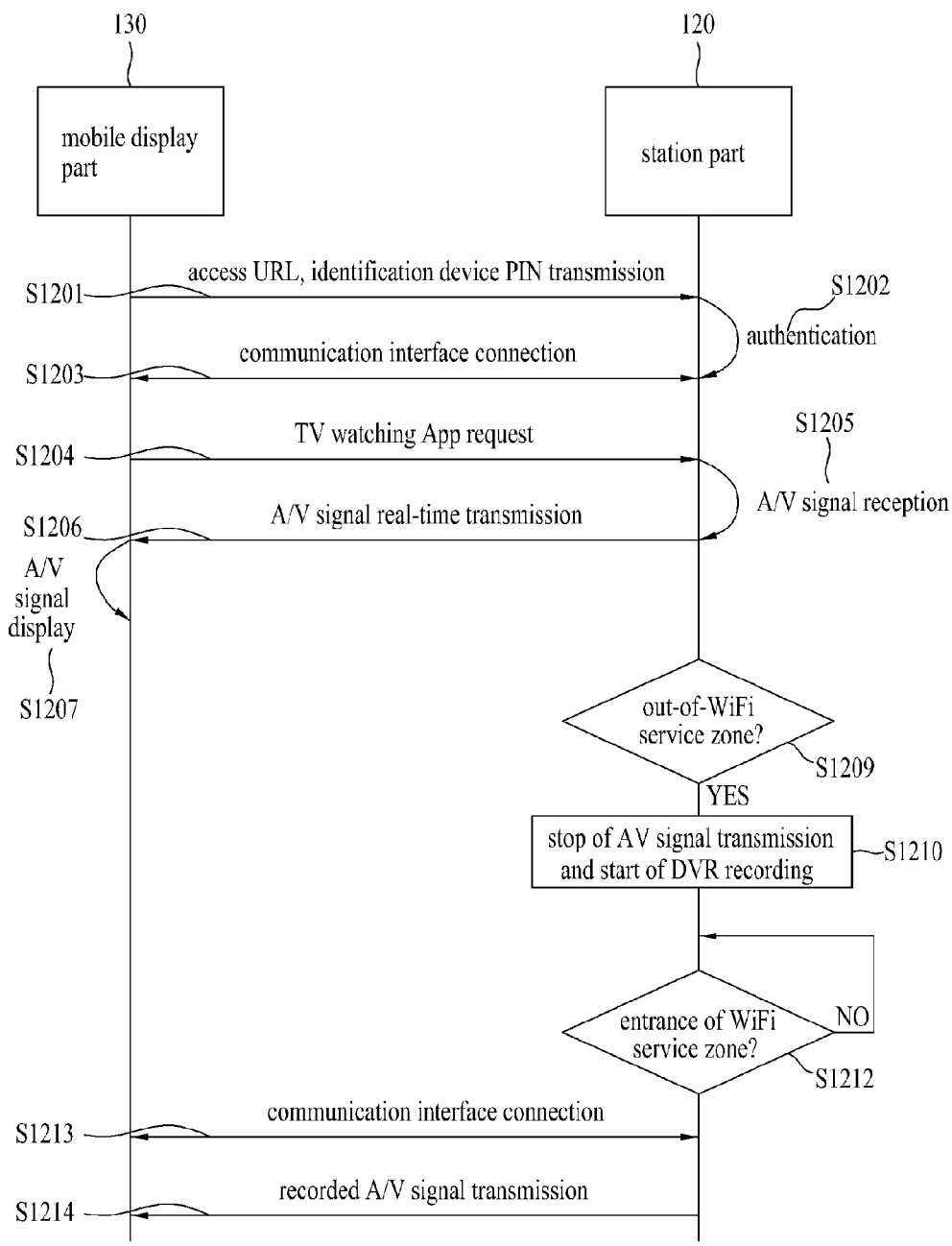
FIG. 12 is a diagram illustrating an operation performed by a system according to one embodiment of the present invention.

FIG. 12 is a diagram illustrating an operation performed by a system according to one embodiment of the present invention.

Referring to FIG. 12, since steps S1201, S1202, S1203, S1204, S1205 and S1206, and S1207 correspond to the steps S901, S902, S903, S904, S905, and S906 of FIG. 9, respectively, their detailed description will be omitted. In FIG. 12, the control data in the step S904 of FIG. 9 are control data requesting TV watching. Also, referring to FIG. 12, steps S1209, S1210, S1212, S1213 and S1214 can further be performed as compared with FIG. 9.

The wireless communication network 140 includes a communication available zone for data transmission and reception services. In this case, if at least one of the station part 120 and the mobile display part 130 is beyond the communication available zone of the wireless communication network 140, AV signal transmission and reception between the station part 120 and the mobile display part 130 may not be performed. FIG. 12 illustrates that operation of the system according to one embodiment of the present invention, which can solve a problem of disturbance in watching TV, wherein the problem may occur due to impossible transmission and reception of the AV signal.

The control module of the station part 120 can determine whether at least one of the station part 120 and the mobile display part 130 has left the communication available zone of the wireless communication network (for example, Wi-Fi Direct) (S1209). In case of the Wi-Fi Direct network, since the communication available zone between the devices is within 120 meters, the control module can determine whether the station part 120 and the mobile display part 130 exist within 120 meters from each other.

Also, in the step S1209, the control module can determine that at least one of the station part 120 and the mobile display part 130 has left the communication available zone if a feedback signal is not transmitted from the mobile display part 130. For example, the mobile display part 130 and the station part 120 can periodically output the feedback signal to identify mutual connection of the wireless communication network. For example, the station part 120 can identify connection of the wireless communication network by receiving the feedback signal output from the mobile display part 130. If the feedback signal is not transmitted, the station part 120 can determine that the mobile display part 130 has left the communication available zone.

If it is determined that the station part 120 or the mobile display part has left the communication available zone in the step S1209, the control module of the station part 120 records the AV signal input from the AV signal supply source 170 from the time when the mobile display part 130 has left the communication available zone, or stores the image screen information of the AV signal at the time when the mobile display part 130 has left the communication available zone (S1210).

The operation at the step S1210 corresponds to the operation of the step S911, and the time when the mobile display part 130 has left the communication available zone at the step S1210 corresponds to the discharge time of the step S911. The recording operation of the step S1210 can be performed until the station part 120 or the mobile display part 130, which has left the communication available zone of the wireless communication network, re-enters the communication available zone of the wireless communication network, or until the corresponding content ends.

If at least one of the station part 120 and the mobile display part 130 lefts the communication available zone of the wireless communication network, the station part 120 and the mobile display part 130 cannot transmit and receive the AV signal to and from each other. As a result, the user cannot watch the image corresponding to the AV signal. Accordingly, if the control module records the AV signal from the time when the station part 120 or the mobile display part 130 lefts the communication available zone and the station part 120 or the mobile display part 130 re-enters the communication available zone of the wireless communication network in the following step S1212, the mobile display part 130 plays back the recorded AV signal. Then, the user can continue to watch the other contents of which watching has been stopped as the station part 120 or the mobile display part 130 has left the communication available zone of the wireless communication network.

Also, if it is determined that the station part 120 or the mobile display part 130 has left the communication available zone in the step S1209, the mobile display part 130 or the station part 120 can output a signal (for example, signal that can be recognized visually or auditorily) indicating that the station part 120 or the mobile display part 130 has left the communication available zone. As a result, the user can quickly recognize that the station part 120 or the mobile display part 130 has left the communication available zone in the step S1209.

Subsequently, the control module 330 of the station part 120 periodically determines whether the mobile display part 130 or the station part 120, which has left the communication available zone, re-enters the communication available zone of the wireless communication network (S1212). For example, the control module can perform the step S1212 by determining whether the feedback signal is received.

As a result of the step S1212, if the mobile display part 130 or the station part 120, which has left the communication available zone, returns to the communication available zone, the station part 120 re-connects the wireless communication network with the mobile display part 130 (S1213). In more detail, the mobile display part 130 transmits access node information for re-connection of the wireless communication network to the station part 120, and the station part 120 re-connects the wireless communication network based on the access node information. For example, if the mobile display part 130 returns to the original position, it can transmit the previous access node information to the station part 120.

Subsequently, the control module 330 of the station part 120 transmits the AV signal, which is re-input from the AV signal supply source 170, to the mobile display part 130 based on the AV signal recorded in the step S1210 or the image screen information stored in the step S1210 (S1214). Since the step S1214 corresponds to the S912, its detailed description will be omitted.

Figure 13:
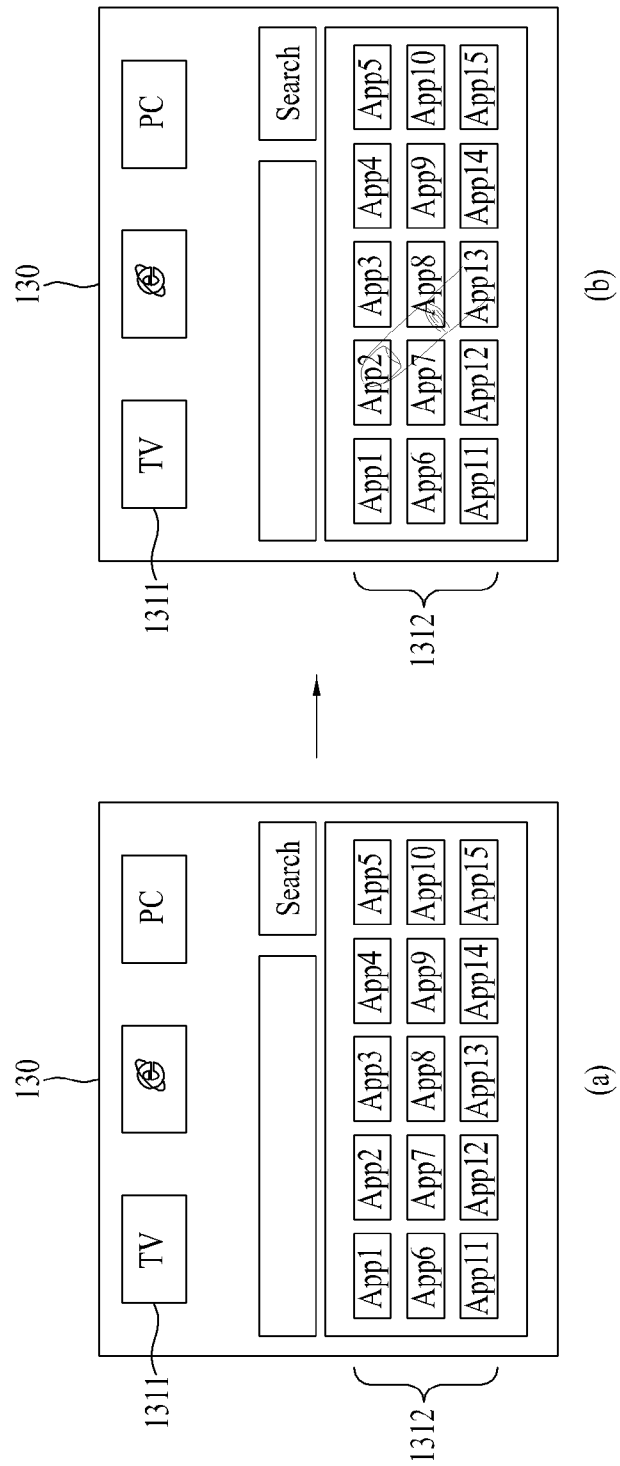
FIG. 13 is a diagram illustrating a detailed operation performed by a system according to one embodiment of the present invention.

FIG. 13 is a diagram illustrating a detailed operation performed by a system according to one embodiment of the present invention.

The control data transmitted in the step S904 or S907 may be control data requesting a search service.

Referring to (a) of FIG. 13, the station part 120 transmits the AV signal corresponding to a user interface screen for search in accordance with the request of the search service (S905). The mobile display part 130 outputs the user interface screen for search. In this case, the data included in a search range include at least one of data stored in the station part 120, data stored in the AV signal supply source 170 (for example, external device 315) connected with the station part 120, and data that can be accessed or input by the station part 120 or the external device 315. In other words, the user interface screen output from the mobile display part 130 is the user interface screen for searching predetermined data from the data included in the aforementioned search range.

Referring to (a) of FIG. 13, the output user interface screen can include a key 1311 for searching the station part 120 of the TV, an Internet search key, a PC search key, a plurality of available application lists 1312, and a search window where a search key can be input.

Referring to (b) of FIG. 13, if the mobile display part 130 includes a touch screen 585, the user can select a predetermined application (for example, App2) through a touch action.

The mobile display part 130 can transmit control data requesting execution of the selected predetermined application App2 or control data requesting output of information related to the predetermined application App2 to the station part 120 in accordance with the selection of the user. Then, the station part 120 can perform an operation corresponding to the control data.

Various embodiments of the present invention have been described as above with reference to FIG. 1 to FIG. 13. Hereinafter, the second embodiment, the third embodiment and the fourth embodiment of the present invention will be described in more detail. In particular, FIG. 14 to FIG. 19 are directed to the second embodiment, FIG. 20 to FIG. 24 are directed to the third embodiment, and FIG. 25 is directed to the fourth embodiment. A new embodiment achieved by combination of the respective embodiments pertains to the scope of the present invention, and the second to fourth embodiments may be interpreted with reference to the embodiment described with reference to FIG. 1 to FIG. 13.

Figure 14:
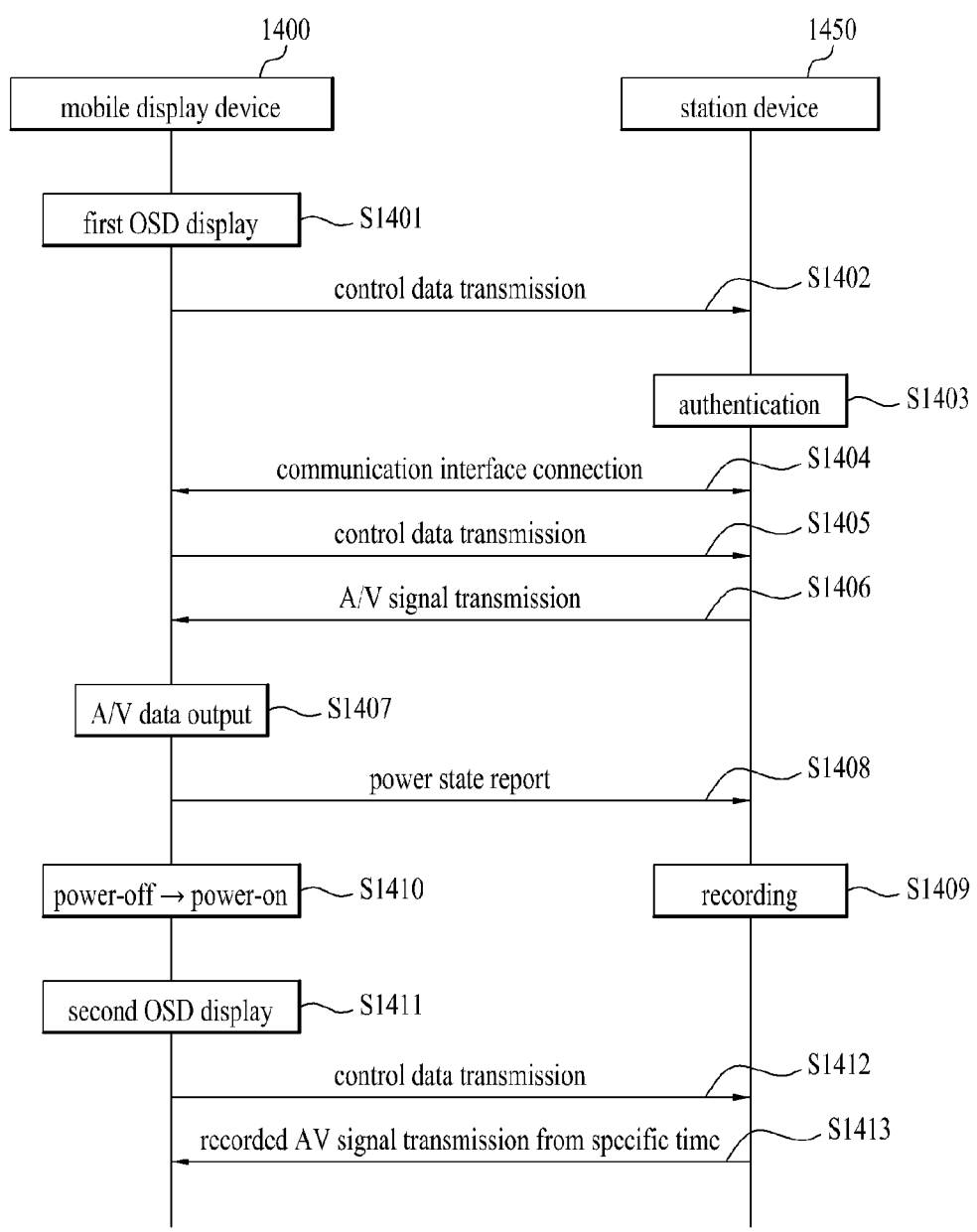
FIG. 14 is a flow chart illustrating a data transmission protocol between a mobile display device and a station device according to the second embodiment of the present invention.

FIG. 14 is a flow chart illustrating a data transmission protocol between a mobile display part and a station part according to the second embodiment of the present invention. Hereinafter, a solution for outputting AV data from a mobile display part which is powered off will be described with reference to FIG. 14. Also, FIG. 14 may be interpreted with reference to the flow charge illustrated in FIG. 9.

First of all, a mobile display device 1400 illustrated in FIG. 14 corresponds to the aforementioned mobile display part, and a station device 1450 corresponds to the aforementioned station part. Moreover, the mobile display device described in this specification corresponds to all kinds of devices that receive AV data from the station device and display the AV data. Any one of the existing smart phone, tablet PC and feature phone may be designed as the mobile display device. This pertains to the scope of the present invention.

The mobile display device 1400 outputs three modes for selecting a specific condition for storing AV data in the station device 1450 (S1401). This will be referred to as a first OSD, which will be described in more detail with reference to FIG. 15.

In the mean time, although FIG. 14 illustrates the aforementioned step S1401 as an initial step, the step S1401 may be performed after the step S1404 in accordance with another embodiment of the present invention. This design also pertains to the scope of the present invention.

The mobile display device 1400 transmits control data for connection with the station device 1450 through a communication interface (S1402). Examples of the communication interface include, but not limited to, Wi-Fi, Wi-Fi Direct, Bluetooth 3.0, and Bluetooth 4.0.

Also, the control data transmitted at the step S1402 include authentication information (URL information for accessing authentication server, PIN information, ID information of the mobile display device, which is generated based on the PIN information, etc.).

The station device 1450 authenticates connection of the wireless communication network based on the transmitted authentication information (S1403), and communication interface connection between the mobile display device 1400 and the station device 1450 is completed (S1404). Accordingly, the mobile display device 1400 is setup to receive AV data of various formats from the station device 1450.

The mobile display device 1400 transmits control data requesting specific AV data to the station device 1450 (S1405). For example, the specific AV data requested at the step S1405 correspond to AV data of a specific channel broadcasted from the broadcasting station.

The station device 1450 transmits the AV data received from the broadcasting station in real-time to the mobile display device (S1406). However, the station device 1450 is designed to encode broadcast data received from the broadcasting station in accordance with a data format suitable for the Wi-Fi communication standard or convert the broadcast data to a data format that can be decoded and output from the mobile display device 1400 before the step S1406 is performed.

The mobile display device 1400 outputs the AV data transmitted from the station device 1450 (S1407). The mobile display device 1400 is designed to decode the data received from the station device 1450 before the step S1407 is performed. In other words, it is advantageous in that the mobile display device 1400 does not need a separate encoder.

The mobile display device 1400 is designed to transmit data indicating the power state to the station device 1450 (S1408). In the mean time, in the step S1408, the mobile display device 1400 may be designed to transmit the data per previously set period (for example, 1 second, 5 seconds, etc.), or may be designed to transmit the data at a specific power state only (for example, only if remainder of 1%, 2%, 3%, 4%, 5%, 6%, 7%, 8%, 9% or 10% remains based on a total of battery capacity).

The station device 1450, which has received the power state from the mobile display device 1400, is designed to store specific AV data transmitted to the mobile display device 1400 in the memory (S1409). The step S1409 will be described in more detail with reference to FIG. 17 and FIG. 18.

The present invention can be implemented by two embodiments. According to the first embodiment, the mobile display device 1400 is designed to transmit data indicating the power state to the station device 1450 per previously set period. Moreover, the station device 1450 determines whether the data received from the mobile display device 1400 correspond to a reference value (for example, battery capacity less than 10% or 5%), and stores the specific AV data in the memory depending on the determined result. In this case, it is advantageous in that the mobile display device 1400 does not need to determine whether the battery state is less than a threshold value.

On the other hand, according to the second embodiment, the mobile display device 1400 is designed to transmit data guiding a discharge state to the station device 1450 in case of a specific condition only (for example, only if a battery capacity is less than 1%, 2%, 3%, 4%, 5%, 6%, 7%, 8%, 9% or 10%). The station device, which has received the data, directly stores the specific AV data in the memory. In this case, it is advantageous in that data processing speed of the station device 1450 can be increased.

In the mean time, it is supposed that the mobile display device 1400 is powered off due to its continuous use. In this case, according to the related art, a problem occurs in that the user of the mobile display device 1400 cannot watch the AV data transmitted at the step S1406 any more.

In order to solve the problem, if a power supply unit (for example, power adapter) is connected to the mobile display device 1400, the power of the mobile display device 1400 is changed from the power-off state to the power-on state (S1410). At this time, the mobile display device 1400 displays a second OSD (S1411) to provide a guide message for allowing the user to watch the AV data of which transmission has been stopped from the power-off time. This will be described with reference to FIG. 19.

The mobile display device 1400 transmits control data requesting the AV data, of which transmission has been stopped from the power-off time, to the station device 1450 (S1412). Also, since the station device 1450 stores the AV data in the memory at the step S1409, it can transmit the recorded AV data to the mobile display device 1400 from a specific time (S1413).

Figure 15:
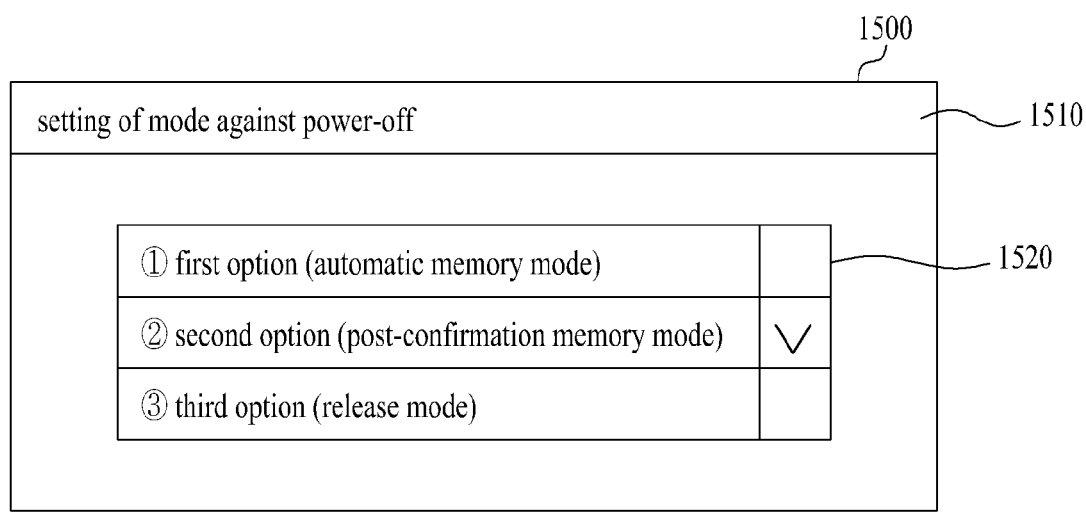
FIG. 15 is a diagram illustrating an example of a first OSD illustrated in FIG. 14.

FIG. 15 is a diagram illustrating an example of a first OSD illustrated in FIG. 14. Hereinafter, three modes against power-off will be described in detail with reference to FIG. 15. Although the first OSD of FIG. 15 may be output at the step S1401 of FIG. 14, it may be designed to include any one of the other steps of FIG. 14 if necessary. This design pertains to the scope of the present invention.

The mobile display device 1500 according to the second embodiment of the present invention outputs a menu 1510 screen for solving the power-off state, which cannot output the AV data received from the station device.

At this time, as illustrated in FIG. 15, a list 1520 guiding three modes is output. The first option included in the list 1520 corresponds to an automatic memory mode, the second option corresponds to a post-confirmation memory mode, and the third option corresponds to a release mode.

For the case where the power of the mobile display device 1500 is changed to the discharge state, the first option is designed to allow the station device to automatically store the AV data, which are being transmitted. In this case, two embodiments can be implemented as described above. According to the first embodiment, the mobile display device is designed to transmit data indicating the power state to the station device per previously set period. On the other hand, according to the second embodiment, the mobile display device is designed to transmit data guiding the discharge state to the station device in case of a specific condition only.

Also, according to the second option, if the power of the mobile display device 1500 reaches less than a previously set threshold value, a message asking whether to set the AV data, which are being transmitted, to be stored in the station device is output. In particular, the second option will be described in more detail with reference to FIG. 16.

The third option is set not to store the AV data, which are being transmitted, regardless of power change of the mobile display device 1500. Accordingly, the user of the mobile display device 1500 can select a desired option depending on his/her preference.

FIG. 16 is a diagram illustrating a first state change of a mobile display device illustrated in FIG. 14. Hereinafter, an OSD output when the power of the mobile display device is shifted from the power-on state to the power-off state will be described.

First of all, as illustrated in (a) of FIG. 16, the mobile display device according to the second embodiment of the present invention decodes the AV data (for example, radio broadcast program) received from the station device and outputs the decoded AV data.

Moreover, if the power of the mobile display device reaches a previously set threshold value (for example, if the remaining power is less than 10% or 5% in comparison with a total of battery capacity) as time goes by, the mobile display device according to the second embodiment outputs a message asking whether to store a broadcast program, which is being watched by the user, as illustrated in (b) of FIG. 16. If it is selected to store the broadcast program, the broadcast program is designed to be stored in the memory of the station device not the mobile display device. To this end, at least one of the aforementioned two types of data is transmitted from the mobile display device to the station device. The two types of data correspond to data indicating the power state of the mobile display device or data guiding the discharge state.

If much more time goes by, the power of the mobile display device is discharged to the power-off state as illustrated in (c) of FIG. 16. In the mean time, the embodiment corresponding to the case where the power of the mobile display device is shifted to the power-on state will be described in more detail with reference to FIG. 19.

FIG. 17 is a diagram illustrating a mapping relation between a mobile display device and a station device in accordance with the second embodiment of the present invention. Hereinafter, a method for determining the power state of the mobile display device and a solution for determining a recording interval will be described.

First of all, as illustrated in FIG. 17, if the power of the mobile display device reaches a specific threshold value, the station device is designed to store the AV data, which are being transmitted, in the memory.

However, for this design, the following three matters should be clarified.

First of all, a reference for determining whether the power of the mobile display device is in a possible danger state will be described. For example, as compared with that the power of the mobile display device is fully charged to a level of 100%, if the current power of the mobile display device is less than a specific level (for example, 10%, 5%, 3%, etc.), it is regarded that the power of the mobile display device is in a possible danger state. In other words, an automatic memory process of the station device should be started at this time. Although the danger state of the mobile display device can be determined by the aforementioned specific rate, it may be predicted by calculating a power rate reduced by the time when the current AV data are being played.

Second, when the power of the mobile display device is in the danger state, description as to when the station device should store the corresponding AV data will be made. The station device, which has been reported in respect of the danger state of the mobile display device, is designed to store the AV data, which are being transmitted, from the time when it has been reported. Although this design is considered that the charging state of the power may be deteriorated rapidly if multi-tasking (for example, execution of other application) is performed using the mobile display device, it may be changed by the skilled person in the art if necessary.

For example, if the power of the mobile display device remains as much as 10%, the station device, which has been reported the remaining power of the mobile display device, is designed to store a current broadcast program (event) in the memory from the time when it has been reported. In FIG. 17, it is supposed that the time corresponds to the time when the current broadcast program (event) is broadcasted for 1.5 hours. The aforementioned numerical values are only exemplary, and the scope of the present invention should basically be defined by claims.

Third, description as to how long the station device should store the corresponding AV data will be made with reference to FIG. 18.

FIG. 18 is a diagram illustrating a data structure used in a procedure for carrying out the second embodiment of the present invention. Although a start time for storing the corresponding AV data has been described in FIG. 17, an end time for ending storage of the corresponding AV data will be described in FIG. 18.

In an EIT illustrated in FIG. 18, a table_id field displays a unique table identifier (ID) allocated to uniquely identify EIT. In other words, the table_id field represents that a table to which a received section belongs is the EIT.

A section_syntax_indicator field can be set to a value of 1, and means that a general MPEG-2 section syntax is subsequent to a section_length field. A private_indicator field allocates '1', for example. The section_length field represents the other length of the section from the section_length field to the end of the section in a byte unit.

A source_id field displays source_id of a virtual channel through which events described in the section are transmitted. A version_number field represents a version value of EIT-i. The version_number field can be represented by a remainder value obtained by dividing a value of EIT-i increased as much as 1 by 32 when a content of EIT-i is changed.

A current_next_indicator field displays that a transmitted table is always available, and can be set to 1. The section_number field displays a number of a corresponding section. A last_section_number field displays the last section number of a full EIT.

A protocol_version field is set to an initial value of 0, and is set to another value not 0 if a protocol is changed. A num_events_in_section field displays the number of events existing in the corresponding EIT section. If the num_events_in_section field value is 0, it represents that there is no event defined in the corresponding section.

An event loop repeated as much as the number of events included in the section exists next to the num_events_in_section field. The event loop includes an event_id field, a start_time field, an ETM_location field, a length_in_seconds field, a title_length field, and a title_text( ) field.

Also, the event loop can further include a descriptor_length field and a descriptor( ) field, which are separately applied to each event.

The event_id field represents an identification number that can identify a corresponding event in the event loop. This identification number can be used as a part of event ETM-id.

The start_time field displays a start time of the event.

The ETM_location field displays the presence and position of an extended text message (ETM).

The length_in_seconds field displays duration of the event in a second unit.

The title_length field displays a length of title_text( ) subsequent thereto, in a byte unit.

If the title_length field value is 0, it means that there is no title in the corresponding event.

The title_text( ) field displays an event title of a multiple string structure.

The descriptor_length field displays an overall length of an event descriptor subsequent thereto, in a byte unit.

Accordingly, the end time of the current event (broadcast program) can be calculated using the start_time field and the length_in_seconds field illustrated in FIG. 18. The station device is designed to maintain a memory process by the end time of the event (broadcast program) currently stored in the memory.

Figure 19:
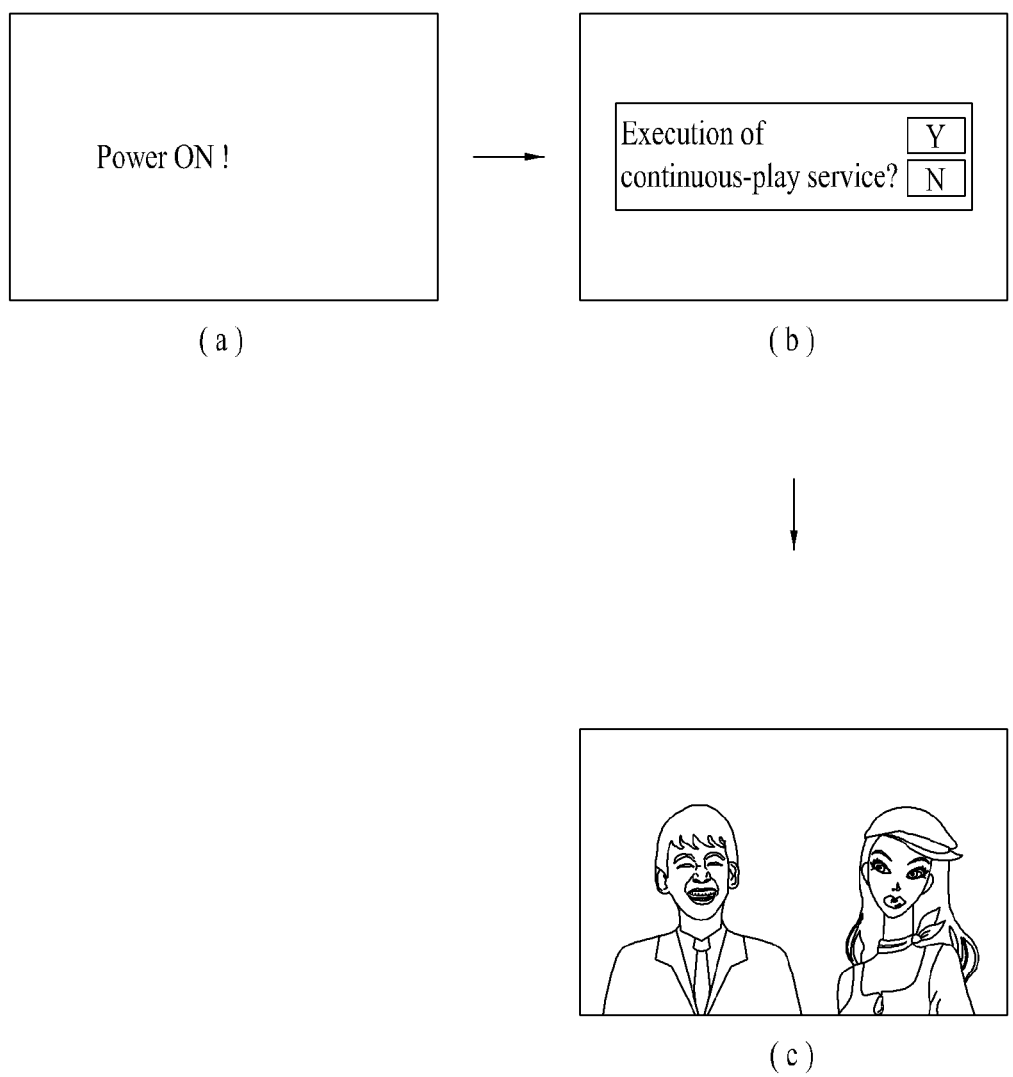
FIG. 19 is a diagram illustrating a second state change of a mobile display device illustrated in FIG. 14.

FIG. 19 is a diagram illustrating a second state change of a mobile display device illustrated in FIG. 14. Hereinafter, an OSD output when the power of the mobile display device is shifted from the power-off state to the power-on state will be described. It is supposed that the first state change of FIG. 16 is preceded by the second state change of FIG. 19.

First of all, as described in the step S1410 of FIG. 14, if the mobile display device of which power is turned off in the course of outputting the AV data received from the station device is normally supplied with the power again, a message guiding that the power state is shifted from the power-off state to the power-on state is output as illustrated in (a) of FIG. 19.

Moreover, the mobile display device, as illustrated in (b) of FIG. 19, displays a message asking whether to select a continuous-play service of the AV data of which transmission has been stopped abnormally due to the power-off. (b) of FIG. 19 may be designed as option, and (a) of FIG. 19 may directly be shifted to (c) of FIG. 19 within the scope of the present invention.

If the user selects a continuous-play service in (b) of FIG. 19, the mobile display device can receive the previously stored AV data from the station device. At this time, as illustrated in (c) of FIG. 19, the AV data are output from the time when the output of the AV data has been abnormally stopped due to the power-off.

Accordingly, according to the second embodiment of the present invention described with reference to FIG. 14 to FIG. 19, it is advantageous in that the user of the mobile display device can continue to watch the AV data, which are being transmitted, regardless of the power supply state.

Also, since the automatic memory mode and the automatic memory time can be designed to be controlled depending on preference of the user, it is advantageous in that a more customized service can be provided to the user of the mobile display device.

Figure 20:
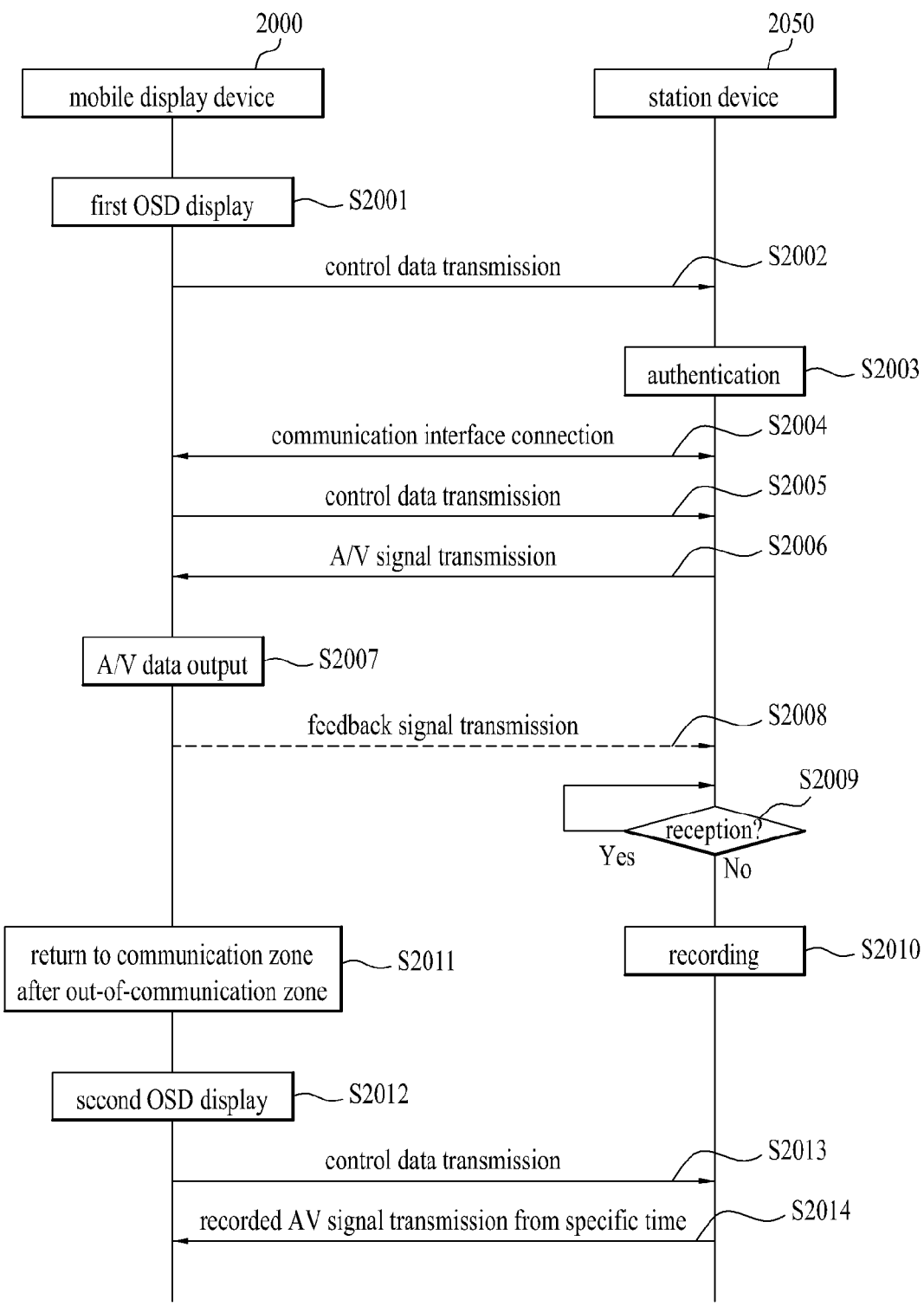
FIG. 20 is a flow chart illustrating a data transmission protocol between a mobile display device and a station device according to the third embodiment of the present invention.

FIG. 20 is a flow chart illustrating a data transmission protocol between a mobile display device and a station device according to the third embodiment of the present invention. Hereinafter, a solution for outputting AV data from a mobile display device that has left a communication available zone will be described with reference to FIG. 20. Also, FIG. 20 may be interpreted using the flow chart illustrated in FIG. 12. The communication available zone means, but not limited to, a short range wireless communication zone between the mobile display device 2000 and the station device 2050.

First of all, the mobile display device 2000 illustrated in FIG. 20 corresponds to the aforementioned mobile display device, and the station device 2050 corresponds to the aforementioned station device.

The mobile display device 2000 outputs three modes for selecting a specific condition for storing AV data in the station device 2050 (S2001). This will be referred to as a first OSD, which will be described in more detail with reference to FIG. 21.

In the mean time, although FIG. 20 illustrates the aforementioned step S2001 as an initial step, the step S2001 may be performed after the step S2004 in accordance with another embodiment of the present invention. This design also pertains to the scope of the present invention.

The mobile display device 2000 transmits control data for connection with the station device 2050 through a communication interface (S2002). Examples of the communication interface include, but not limited to, Wi-Fi, Wi-Fi Direct, Bluetooth 3.0, and Bluetooth 4.0.

Also, the control data transmitted at the step S2002 include authentication information (URL information for accessing authentication server, PIN information, ID information of the mobile display device, which is generated based on the PIN information, etc.).

The station device 2050 authenticates connection of the wireless communication network based on the transmitted authentication information (S2003), and communication interface connection between the mobile display device 2000 and the station device 2050 is completed (S2004). Accordingly, the mobile display device 2000 is setup to receive AV data of various formats from the station device 2050.

The mobile display device 2000 transmits control data requesting specific AV data to the station device 2050 (S2005). The specific AV data requested at the step S2005 correspond to AV data of a specific channel broadcasted from the broadcasting station.

The station device 2050 transmits the AV data received from the broadcasting station in real-time to the mobile display device 2000 (S2006). However, the station device 2050 is designed to encode broadcast data received from the broadcasting station in accordance with a data format suitable for the Wi-Fi communication standard or convert the broadcast data to a data format that can be decoded and output from the mobile display device 2000 before the step S2006 is performed.

The mobile display device 2000 outputs the AV data transmitted from the station device 2050 (S2007). The mobile display device 2000 is designed to decode the data received from the station device 2050 before the step S2007 is performed. In other words, it is advantageous in that the mobile display device 2000 does not need a separate encoder.

The mobile display device 2000 is designed to transmit a feedback signal periodically or non-periodically, wherein the feedback signal reports the communication connections state (S2008). There is no specific limitation in the feedback signal used at the step S2008, and all data formats that can identify the communication connection state can be applied to the feedback signal.

Accordingly, the station device 2050 determines whether the feedback signal has been received at the step S2008 (S2009). If the feedback signal is not received, the station device 2050 can predict that the mobile display device 2000 has left the communication available zone.

At this time, the station device 2050 is designed to store specific AV data transmitted to the mobile display device 2000 (S2010). The steps 2009 and 2010 will be described in more detail with reference to FIG. 23.

In the mean time, if the mobile display device 2000, which has left the communication zone, returns to the communication zone, according to the related art, a problem occurs in that the user cannot watch the AV data any more from the time when the mobile display device has left the communication zone.

In order to solve the problem, the mobile display device 2000 displays a second OSD (S2012) to provide a guide message for allowing the user to watch the AV data of which transmission has been stopped from the time when the mobile display device 2000 has left the communication zone. This will be described with reference to FIG. 24.

The mobile display device 2000 transmits control data requesting the AV data, of which transmission has been stopped from the time when the mobile display device has left the communication zone, to the station device 2050 (S2013). Also, since the station device 2050 stores the AV data in the memory at the step S2010, it can transmit the recorded AV data to the mobile display device 2000 from a specific time (S1413).

Figure 21:
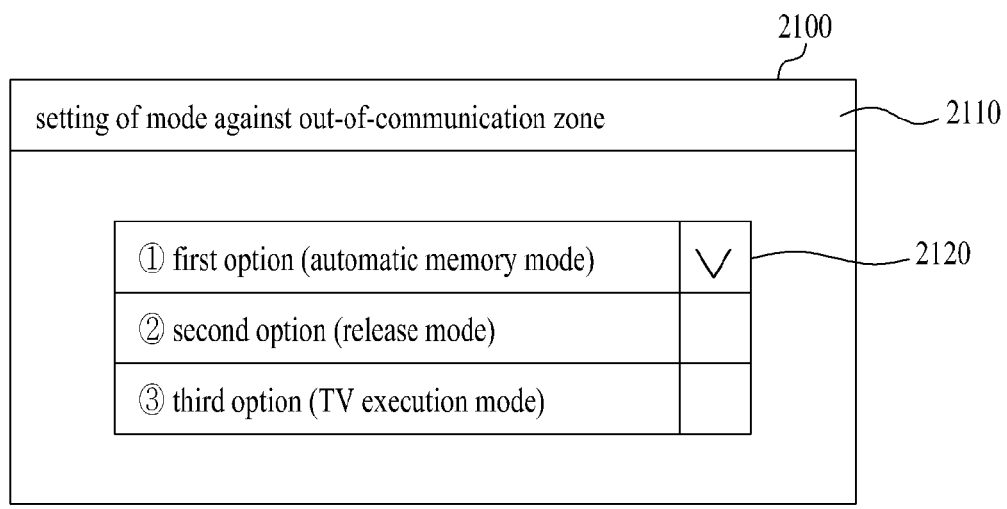
FIG. 21 is a diagram illustrating an example of a first OSD illustrated in FIG. 20.

FIG. 21 is a diagram illustrating an example of a first OSD illustrated in FIG. 20. Hereinafter, three modes against out-of-communication zone will be described in detail with reference to FIG. 21. Although the first OSD of FIG. 21 may be output at the step S2001 of FIG. 20, it may be designed to include any one of the other steps of FIG. 20 if necessary. This design pertains to the scope of the present invention.

The mobile display device 2100 according to the third embodiment of the present invention outputs a menu 2110 screen for solving the out-of-communication zone state, which cannot output the AV data received from the station device.

At this time, as illustrated in FIG. 21, a list 2120 guiding three modes is output. The first option included in the list 2120 corresponds to an automatic memory mode, the second option corresponds to a release mode, and the third option corresponds to a TV execution mode.

For the case where the mobile display device 2100 is changed to the out-of-communication zone state, the first option is designed to automatically store the AV data, which are being transmitted. The second option is set not to store the AV data, which are being transmitted, regardless of the fact whether the mobile display device 1500 has left the communication zone.

The third option is set to continuously output the AV, which are transmitted to another device (for example, TV that is not required to charge the power) instead of the mobile display device 2100 that is required to charge the power. Accordingly, the user of the mobile display device 2100 can select a desired option depending on his/her preference.

Figure 22:
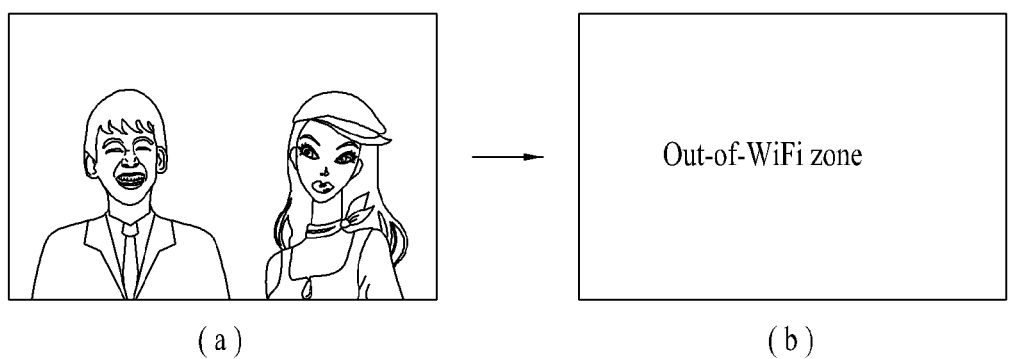
FIG. 22 is a diagram illustrating a first state change of a mobile display device illustrated in FIG. 20.

FIG. 22 is a diagram illustrating a first state change of a mobile display device illustrated in FIG. 20. Hereinafter, an OSD output when the mobile display device is shifted from the communication available zone to the communication unavailable zone will be described.

First of all, as illustrated in (a) of FIG. 22, the mobile display device according to the third embodiment of the present invention decodes the AV data (for example, radio broadcast program) received from the station device and outputs the decoded AV data.

Moreover, if communication between the mobile display device and the station device is disconnected due to a communication error, a data error, position change of the mobile display device, a message guiding that the mobile display device has left the corresponding communication zone is output as illustrated in (b) of FIG. 22. In the mean time, the embodiment corresponding to the case where the mobile display device returns to the communication available zone will be described in more detail with reference to FIG. 24.

FIG. 23 is a diagram illustrating a mapping relation between a mobile display device and a station device in accordance with the third embodiment of the present invention. Hereinafter, a method for determining whether the mobile display device has left a communication zone and a solution for determining a recording interval will be described.

First of all, as illustrated in FIG. 23, if the mobile display device leaves the communication zone, the station device is designed to store the AV data, which are being transmitted, in the memory.

However, for this design, the following three matters should be clarified.

First of all, a reference for determining whether the mobile display device has left the communication zone will be described. For example, if the feedback signal described at the step S2008 of FIG. 20 is not received for a certain time (for example, 10 seconds, 30 seconds, 1 minute, etc.), the station device can predict that the mobile display device has left the communication available zone. In other words, the automatic memory process of the station device should be started at this time.

Second, when the mobile display device has left the communication zone, description as to when the station device should store the corresponding AV data will be made. The station device, which has recognized that the mobile display device is located in the communication available zone, is designed to store the AV data, which are being transmitted, from the time when it has recognized the state of the mobile display device.

For example, if the feedback signal is not received from the mobile display device for 10 seconds or more, the station device is designed to store a current broadcast program (event) in the memory from the time when 10 seconds pass. In FIG. 23, it is supposed that the time corresponds to the time when the current broadcast program (event) is broadcasted for 0.7 hours. The aforementioned numerical values are only exemplary, and the scope of the present invention should basically be defined by claims.

Third, since description as to how long the station device should store the corresponding AV data has been made with reference to FIG. 18, the same description will be omitted.

Figure 24:
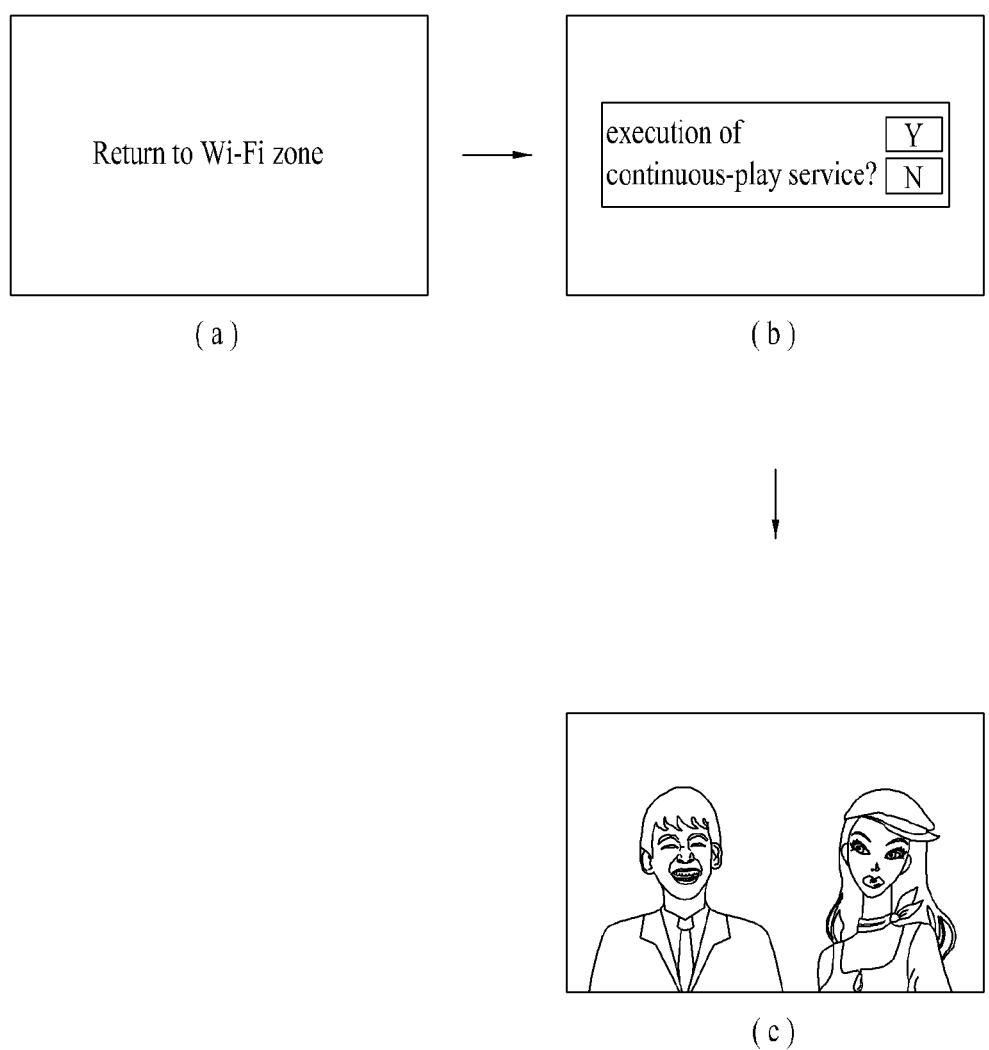
FIG. 24 is a diagram illustrating a second state change of a mobile display device illustrated in FIG. 20.

FIG. 24 is a diagram illustrating a second state change of a mobile display device illustrated in FIG. 20. Hereinafter, an OSD output when the mobile display device, which has left the communication available zone, returns to the communication available zone will be described. It is supposed that the first state change of FIG. 22 is preceded by the second state change of FIG. 24.

First of all, as described in the step S2011 of FIG. 20, if the mobile display device, which has left the communication available zone in the course of outputting the AV data received from the station device, returns to the communication available zone again, a message guiding that the mobile display device has normally accessed the corresponding communication network, is output as illustrated in (a) of FIG. 24. Another icon may be displayed instead of the message.

Moreover, the mobile display device, as illustrated in (b) of FIG. 24, displays a message asking whether to select a continuous-play service of the AV data of which transmission has been stopped abnormally due to the out-of-communication zone. (b) of FIG. 24 may be designed as option, and (a) of FIG. 24 may directly be shifted to (c) of FIG. 24 within the scope of the present invention.

If the user selects a continuous-play service in (b) of FIG. 24, the mobile display device can receive the previously stored AV data from the station device. At this time, as illustrated in (c) of FIG. 24, the AV data are output from the time (or certain delayed time) when the mobile display device has left the communication available zone.

Accordingly, according to the third embodiment of the present invention described with reference to FIG. 20 to FIG. 24, it is advantageous in that the user of the mobile display device can continue to watch the AV data, which are being transmitted, regardless of the fact whether the mobile display device has left the communication available zone.

Also, since the automatic memory mode and the automatic memory time can be designed to be controlled depending on preference of the user, it is advantageous in that a more customized service can be provided to the user of the mobile display device.

FIG. 25 is a flow chart illustrating a data transmission protocol between a mobile display device and a station device according to the fourth embodiment of the present invention. Hereinafter, a data transmission protocol among the mobile display device, the station device and a TV according to the fourth embodiment of the present invention will be described with reference to FIG. 25.

In the aforementioned embodiments, the AV data are stored in the memory depending on the specific condition and then output to the mobile display device. On the other hand, a process for outputting the AV data from another third device will be described. For example, the third option is selected in FIG. 21, and the steps S2001 to S2010 of FIG. 20 are performed in the same manner in FIG. 25. Accordingly, FIG. 25 should be understood with reference to FIG. 20 and FIG. 21.

As described with reference to FIG. 20, the station device 2550, which has recognized that the mobile display device 2500 according to the fourth embodiment has left the communication available zone, stores the AV data, which are being transmitted, in the memory (S2010).

At this time, unlike FIG. 20, according to the fourth embodiment designed in FIG. 25, the station device 2550 directly transmits the AV data, which are being transmitted, to a TV 2570 connected to a wire/wireless network (S2571) by processing the AV data (S2570). The TV 2570 is designed to decode the AV data received from the station device 2550 and output the decoded AV data (S2572).

In this case, the problem that may occur when the mobile display device 2500 cannot return to the communication available zone can be solved. Moreover, the problem of power-off can be solved fundamentally.

Also, the TV 2570 illustrated in FIG. 25 can correspond to the display device of FIG. 10 or FIG. 11. In this case, it is advantageous in that the third device, i.e., the TV can be controlled more easily using a motion remote controller.

Moreover, the station device that can perform communication with the mobile display device is designed to include a wireless communication interface module, an external device interface module, a controller, and a memory.

The wireless communication interface module is designed to connect with a data communication channel with the mobile display device. The external device interface module is designed to receive at least one or more AV data.

If the control data requesting the AV data are received through the data communication channel, the controller controls the wireless communication interface module to transmit the AV data to the corresponding mobile display device. The controller is designed to store the AV data in the memory from the third time after a first event occurs. The time when the first event occurs corresponds to the case where battery capacity of the mobile display device is less than a specific threshold value (for example, the state charged to a level less than 1%, 2%, 3%, 4%, 5%, 6%, 7%, 8%, 90 or 10%), or the case where a signal indicating that the battery capacity is less than the specific threshold value is received.

If a second event occurs, the controller controls the wireless communication interface module to transmit the AV data stored in the memory to the mobile display device. The second event means that the battery capacity of the mobile display device is more than a specific threshold value (for example, the state charged to a level more than 10%), or a signal indicating that the battery capacity is more than the specific threshold value is received, or a signal guiding that the mobile display device is being charged is received.

In the mean time, the embodiment illustrated in FIG. 25 may be applied to the embodiment of FIG. 14 within the scope of the present invention. For example, design may be made in such a manner that the steps S2570 to S2572 of FIG. 25 may be performed without the steps S1410 to S1413 of FIG. 14. Accordingly, if the battery of the mobile display device, which receives AV data from the station device and outputs the AV data, reaches a discharge state, it is advantageous in that the user can continue to watch the AV data within a fast time by using the third device (for example, TV) without charging the mobile display device.

Moreover, although the drawings are illustrated respectively for convenience of description, the embodiments illustrated in the drawings may be incorporated to achieve a new embodiment. A recording medium that can be read from a computer having a program for implementing the aforementioned embodiments may be designed within the scope of the present invention.

The display apparatus and the operation method thereof according to the present invention may be configured by selective combination of all or some of the aforementioned embodiments without limited application of the embodiments, whereby various modifications can be made in the embodiments.

In the mean time, the operation method for the display apparatus according to the present invention can be implemented in a recording medium, which can be read by a processor provided in the display device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor can be stored and implemented in a distributive mode.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A station device configured to perform multiple communications with both a mobile display device and a television, the station device comprising:

a wireless communication interface module connected by a data communication channel to a mobile display device, wherein the wireless communication interface module is further connected to a television upon satisfying a specific condition;

an external device interface module configured to receive at least one AV data;

a controller configured to control the wireless communication interface module to transmit the AV data to the mobile display device if control data requesting the AV data are received through the data communication channel, wherein the controller further is configured to process at least one mode set by the mobile display device; and a memory configured to store the AV data from a broadcast station or a server after a first event occurs and a first mode is set by the mobile display device, wherein the first event is if a feedback signal for the data communication channel is not received from the mobile display device, and wherein the feedback signal is transmitted periodically, wherein after the first event occurs and a second mode is set by the mobile display device, the controller controls the memory to disenable storing the AV data from the broadcast station or the server, wherein after the first event occurs and a third mode is set by the mobile display device, the controller controls the wireless communication interface module to transmit the AV data without storing the AV data into the memory, and wherein the controller is configured to control the wireless communication interface module to transmit the AV data stored in the memory to the mobile display device if a second event, which is the feedback signal is restored from the mobile display device, occurs after the first event.

2. The station device as claimed in claim 1, further comprising an authentication module configured to determine whether to accept the data communication channel by using authentication information of the mobile display device.

3. The station device as claimed in claim 1, wherein the external device interface module includes at least one of a tuner receiving broadcast data from the broadcasting station and a network interface module receiving Internet data from the server.

4. The station device as claimed in claim 1, wherein the controller is configured to determine whether the feedback signal is received periodically from the mobile display device, and to store a part of the AV data having a specific start time information into the memory if the feedback signal is not received periodically from the mobile display device.

5. The station device as claimed in claim 4, wherein the controller is configured to control the wireless communication interface module to transmit the part of the AV data having the specific start time information to the mobile display device if the feedback signal is received periodically from the mobile display device.

* * * * *